US012639170B2

(12) United States Patent
Pandita et al.

(10) Patent No.: US 12,639,170 B2
(45) Date of Patent: May 26, 2026

(54) TECHNIQUE TO PERFORM INCREMENTAL HIBERNATE AND RESUME OF BARE METAL CLUSTERS

(71) Applicant: Nutanix, Inc., San Jose, CA (US)

(72) Inventors: Akshay Pandita, Jammu (IN); Veeral Prabodhchandra Shah, Pune (IN); Vishvendra Singh Rana, Santa Clara, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 18/788,032

(22) Filed: Jul. 29, 2024

(65) Prior Publication Data

US 2025/0245105 A1    Jul. 31, 2025

(30) Foreign Application Priority Data

Jan. 31, 2024    (IN) .............................. 202441006335

(51) Int. Cl.
*G06F 11/14*        (2026.01)
*G06F 9/50*        (2006.01)
*G06F 11/1446*        (2026.01)

(52) U.S. Cl.
CPC ........ *G06F 11/1461* (2013.01); *G06F 9/5016* (2013.01); *G06F 11/1464* (2013.01)

(58) Field of Classification Search
CPC . G06F 11/1461; G06F 9/5016; G06F 11/1464
USPC .................................................. 711/161, 154
See application file for complete search history.

(56) References Cited

U.S. PATENT DOCUMENTS

| | | | |
|---|---|---|---|
| 8,549,518 B1 | 10/2013 | Aron et al. | |
| 8,601,473 B1 | 12/2013 | Aron et al. | |
| 8,850,130 B1 | 9/2014 | Aron et al. | |
| 9,772,866 B1 | 9/2017 | Aron et al. | |

(Continued)

FOREIGN PATENT DOCUMENTS

| | | |
|---|---|---|
| CN | 110633171 A | 12/2019 |
| WO | 2012048037 A2 | 4/2012 |

OTHER PUBLICATIONS

Bose, S., et al., "CloudSpider: Combining Replication with Scheduling for Optimizing Live Migration of Virtual Machines across Wide Area Networks," May 2011, DOI: 10.1109/CCGrid.2011.16.

(Continued)

*Primary Examiner* — Hosain T Alam
*Assistant Examiner* — Zubair Ahmed
(74) *Attorney, Agent, or Firm* — Vista IP Law Group, LLP

(57) ABSTRACT

The present disclosure describes techniques used in systems, methods, and in computer program products to perform incremental hibernate and resume of bare metal clusters. A replication process can generate full/incremental snapshots at the cluster level and at a resource level of the processes of the cluster. In the even that a user instructs the cluster to hibernate some or all processes of the cluster, the process can capture an incremental snapshot of the corresponding resources far more quickly than would be required to generate full snapshots for those resources. Likewise, system configuration information can be captured to enable the underlying infrastructure of the cluster to be restored in the future. In some embodiments, the approach provided herein also implements an instant restore feature.

27 Claims, 16 Drawing Sheets

(56) References Cited

U.S. PATENT DOCUMENTS

| | | | |
|---|---|---|---|
| 10,860,363 B1 | 12/2020 | Gabrielson | |
| 2010/0250499 A1* | 9/2010 | McAlister | G06F 11/3476 |
| | | | 711/E12.001 |
| 2019/0391880 A1* | 12/2019 | Wang | G06F 11/1461 |
| 2023/0070982 A1 | 3/2023 | McAlister et al. | |

OTHER PUBLICATIONS

"VPSA Hibernation: Another Powerful Tool to Control Your Enterprise Storage-as-a-Service, and Budget," zadara, URL: https://www.zadara.com/blog/2014/04/23/vpsa-hibernation-another-powerful-tool-to-control-your-enterprise-storage-as-a-service-and-budget/, dated Apr. 23, 2014.

Glick, J., et al., "CloudBees CI Disaster Recovery(DR) proof of concept using Velero," CloudBees, URL: https://www.cloudbees.com/blog/cloudbees-ci-disaster-recovery-dr-proof-of-concept-using-velero, date found via Google as May 6, 2022.

"Create Amazon EBS snapshots," AWS, URL: https://docs.aws.amazon.com/ebs/latest/userguide/ebs-creating-snapshot.html, date found via Google as Dec. 15, 2012.

"Hibernate your On-Demand Instance or Spot Instance," AWS, URL: https://docs.aws.amazon.com/AWSEC2/latest/UserGuide/Hibernate.html, date found via Internet Archive as Dec. 9, 2023.

"The Best Disaster Recovery Advice for Failover and Failback Success," Lightedge, URL: https://lightedge.com/failover-failback-success/, dated Mar. 26, 2019.

Poitras, Steven. "The Nutanix Bible" (Apr. 27, 2023), from https://www.nutanixbible.com/pdf/classic.pdf (Publication date based on updated doc publication date; first publication date unknown).

Poitras, Steven. "The Nutanix Bible" (May 21, 2024), from https://www.nutanixbible.com/pdf/classic.pdf (Publication date based on updated doc publication date; first publication date unknown).

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Poitras, Steven. "The Nutanix Bible" (Jul. 9, 2019), from https://nutanixbible.com/ (Publication date based on indicated capture date by Archive.org; first publication date unknown).

Poitras, Steven. "The Nutanix Bible" (Feb. 3, 2020), from https://nutanixbible.com/ (Publication date based on indicated capture date by Archive.org; first publication date unknown).

Poitras, Steven. "The Nutanix Bible" (Aug. 1, 2020), from https://nutanixbible.com/ (Publication date based on indicated capture date by Archive.org; first publication date unknown).

Poitras, Steven. "The Nutanix Bible" (Jan. 31, 2021), from https://nutanixbible.com/ (Publication date based on indicated capture date by Archive.org; first publication date unknown).

Poitras, Steven. "The Nutanix Bible" (Sep. 9, 2022), from https://nutanixbible.com/ (Publication date based on indicated capture date by Archive.org; first publication date unknown).

Cano, I. et al., "Curator: Self-Managing Storage for Enterprise Clusters", *14th USENIX Symposium on Networked Systems Design and Implementation, NSDI '17*, (Mar. 27, 2017).

"Citrix XenDesktop 7.1 on Microsoft Hyper-V Server 2012 R2 on Nutanix Virtual Computing Platform—Solution Design," Citrix Validated Solutions, Prepared by: Citrix APAC Solutions, dated Jun. 25, 2014.

"NeuralMesh by WEKA Architecture Whitepaper," WEKA, URL: https://www.weka.io/resources/white-paper/wekaio-architectural-whitepaper/#, date found via Google as Jun. 20, 2025.

"Veeam Backup & Replication—What's new in v10?," Veeam, URL: https://www.content.shi.com/SHIcom/ContentAttachmentImages/SharedResources/PDFs/Veeam/veeam-030220-backup-10-0-whats-new.pdf, dated Feb. 14, 2020.

"Create an incremental snapshot for managed disks," Microsoft Learn, URL: https://learn.microsoft.com/en-us/azure/virtual-machines/disks-incremental-snapshots?tabs=azure-cli, date found via Google as Dec. 9, 2024.

"Azure Backup and Recovery," DataFlair, URL: https://data-flair.training/blogs/azure-backup-and-recovery/, date found via Google as May 26, 2022.

Poitras, Steven. "The Nutanix Bible" (Sep. 9, 2025), from https://www.nutanixbible.com/pdf/classic.pdf (Publication date based on updated doc publication date; first publication date unknown).

* cited by examiner

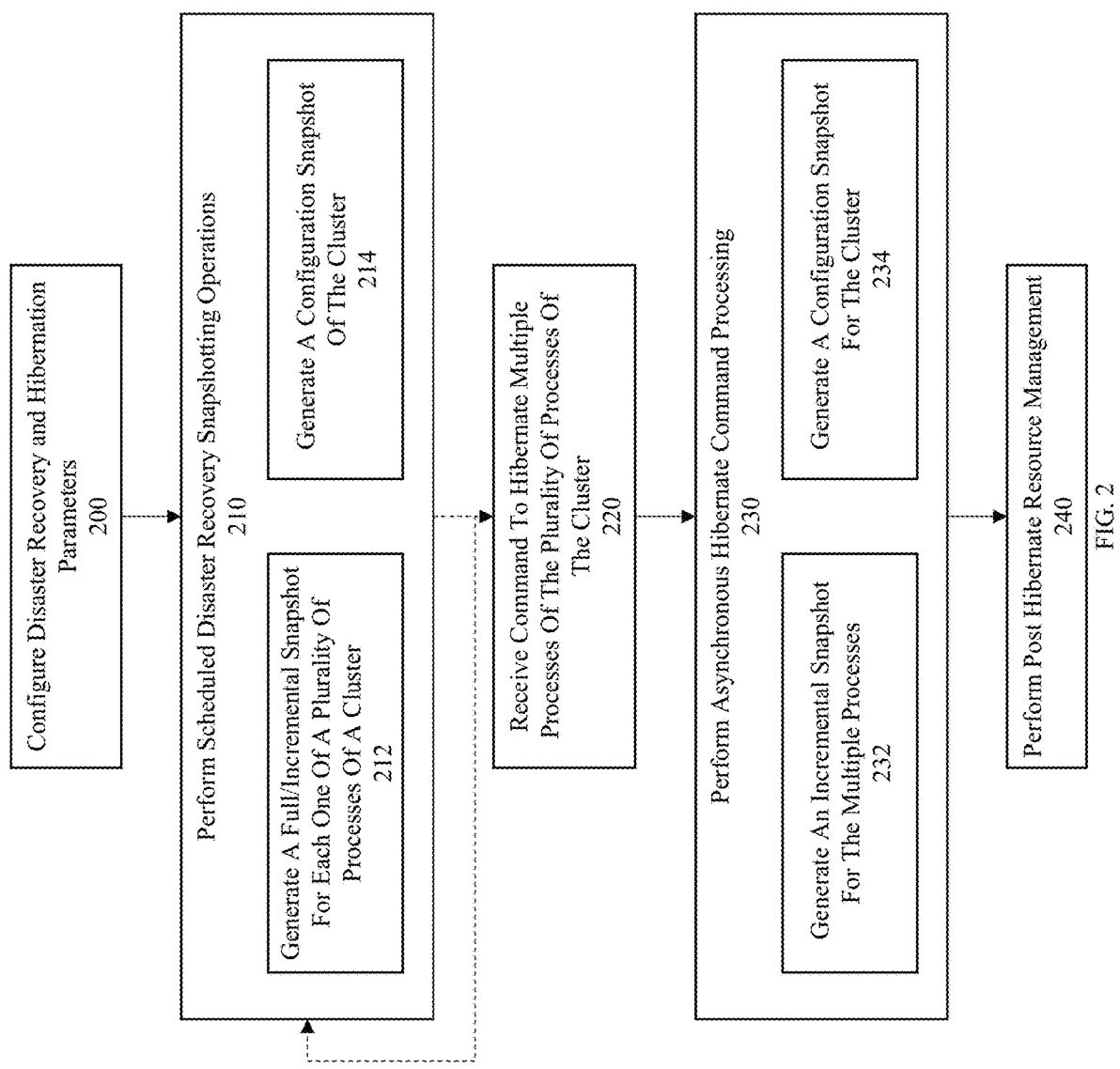

Configure Disaster Recovery and Hibernation Parameters
200

Perform Scheduled Disaster Recovery Snapshotting Operations
210

Generate A Full/Incremental Snapshot For Each One Of A Plurality Of Processes Of A Cluster
212

Generate A Configuration Snapshot Of The Cluster
214

Receive Command To Hibernate Multiple Processes Of The Plurality Of Processes Of The Cluster
220

Perform Asynchronous Hibernate Command Processing
230

Generate An Incremental Snapshot For The Multiple Processes
232

Generate A Configuration Snapshot For The Cluster
234

Perform Post Hibernate Resource Management
240

FIG. 2

Setup Target Storage Location(s)
310

Identify Processes That Are Compatible With The Disaster Recovery, Hibernate, And Resume Functions
312

Identify System Configuration Location(s)
314

Configure Snapshot Schedule For Each Process And The System Configuration
316

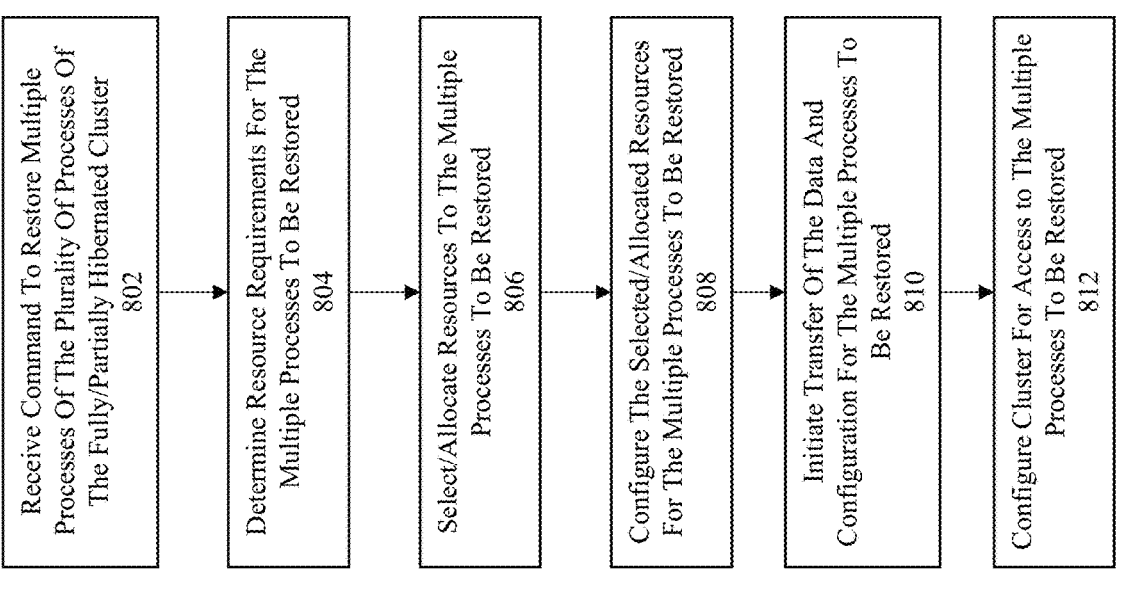

Receive Command To Restore Multiple Processes Of The Plurality Of Processes Of The Fully/Partially Hibernated Cluster 802

Determine Resource Requirements For The Multiple Processes To Be Restored 804

Select/Allocate Resources To The Multiple Processes To Be Restored 806

Configure The Selected/Allocated Resources For The Multiple Processes To Be Restored 808

Initiate Transfer Of The Data And Configuration For The Multiple Processes To Be Restored 810

Configure Cluster For Access to The Multiple Processes To Be Restored 812

FIG. 8

TECHNIQUE TO PERFORM INCREMENTAL HIBERNATE AND RESUME OF BARE METAL CLUSTERS

RELATED APPLICATIONS

The present application claims the benefit of priority to India patent application No. 202441006335 Titled "TECHNIQUE TO PERFORM INCREMENTAL HIBERNATE AND RESUME OF BARE METAL CLUSTERS" filed on Jan. 31, 2024, which is hereby incorporated by reference in its entirety.

TECHNICAL FIELD

This disclosure relates to techniques for hibernating and resuming nodes of a computing cluster.

BACKGROUND

Computing clusters based on virtualization systems involving hypervisors and hypervisor storage and virtualized networking that are used to run virtual machines (VMs) consume actual physical resources such as physical computing hardware and networking hardware. In cloud computing scenarios where such infrastructure is provided, at a cost, to customers by public cloud vendors, customers do not want to pay for resources that are not being used. Nevertheless, customers are reluctant to destroy their virtualization systems for concern of loss of data, or due to concerns or uncertainty as to whether the virtualization system would need to be restored manually to its previous configuration.

Current solutions for hibernate-resume (preserving the state/data of the cluster and restoring the same) of bare metal AWS clusters involves a full copy at the time of hibernation to object storage and full restore at the time of resume. Due to the full copy and full restore, the time taken for hibernate-resume can be very high as it is a function of the size of the data-set on the cluster. Hence the time when the cluster is undergoing hibernate and resume is significant, leading to much higher running costs as the bare metal instances are up and running during such time in addition to the cost to transfer all the information.

In some situations, a cluster might be dormant for a long period of time, during which the costs for use of resources are still being charged. In many cases, such as when there is a large amount of data, the resource usage costs are non-negligible and, as such, the costs for use of the storage resources add up quickly—even though the storage resources are not being used.

In some cases, an entire cluster might be idle. Unfortunately, an idle cluster does not alleviate the issues identified above. This is because the footprint of the cluster (e.g., the resources such as storage and processing power reserved for said cluster) continues to require maintenance which is directly or indirectly responsible for incurring costs for the cluster owner.

Unfortunately, determination of how hibernation of a cluster should be carried out is extremely complicated. Therefore, what is needed is a technique or techniques that help to move data or a cluster in a hibernate/resume scenario.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products to perform incremental hibernate and resume of bare metal clusters. As provided herein, replication operations or a disaster recovery process is used to generate full and incremental snapshots for the cluster, e.g., at the level of resources of the processes of the cluster (e.g., for each process, corresponding volumes are snapshot—such as vDisks, volume groups, and other storage containers). Additionally, configuration information for the cluster can be captured in an easy to restore state. For instance, a management process configuration (e.g., configuration of a process that provides a mechanism to manage one or more clusters) can be captured. Further, the configuration of each system process for the cluster can be captured—e.g., processes to manage a storage pool and provide access thereto. In the event of a failure, the cluster can be restored to a previously captured state. Likewise for individual processes on the cluster. By combining this with an asynchronous snapshot generation process, the creation of relevant snapshots can be generated in an incremental form for up-to-date state capture prior to hibernation of corresponding processes. For example, if a user instructs the cluster to hibernate some or all processes of the cluster, the process can capture an incremental snapshot of the corresponding resources far more quickly than would be required to generate full snapshots for those resources, which enables a cluster owner to manage the processes that are currently on a cluster in a much more responsive manner. Likewise, system configuration information for a management interface and for individual nodes in the cluster can be captured to enable the underlying infrastructure of the cluster to be restored as well.

In some embodiments, the approach provided herein also implements an instant restore feature where, resources corresponding to a restored cluster or portion thereof can be accessed using a set of metadata and a set of logic for performing redirection of requests to a snapshot or incremental snapshot to fetch data that is not yet restored to the cluster. Such an approach can be used to allow processes to be started prior to their data being transferred to the cluster resources and can be combined with redirection mechanisms, copy-on-read, copy-on-write approaches, and background update processes.

Additionally, the approaches provided herein can be used to hibernate some or all of the cluster.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

FIG. 2 illustrates a flow for a technique to perform incremental hibernate and resume of bare metal clusters according to some embodiments.

FIG. 8 illustrates a flow for a snapshot recovery process for a clustered virtualization environment according to some embodiments.

DETAILED DESCRIPTION

Figure 1A:
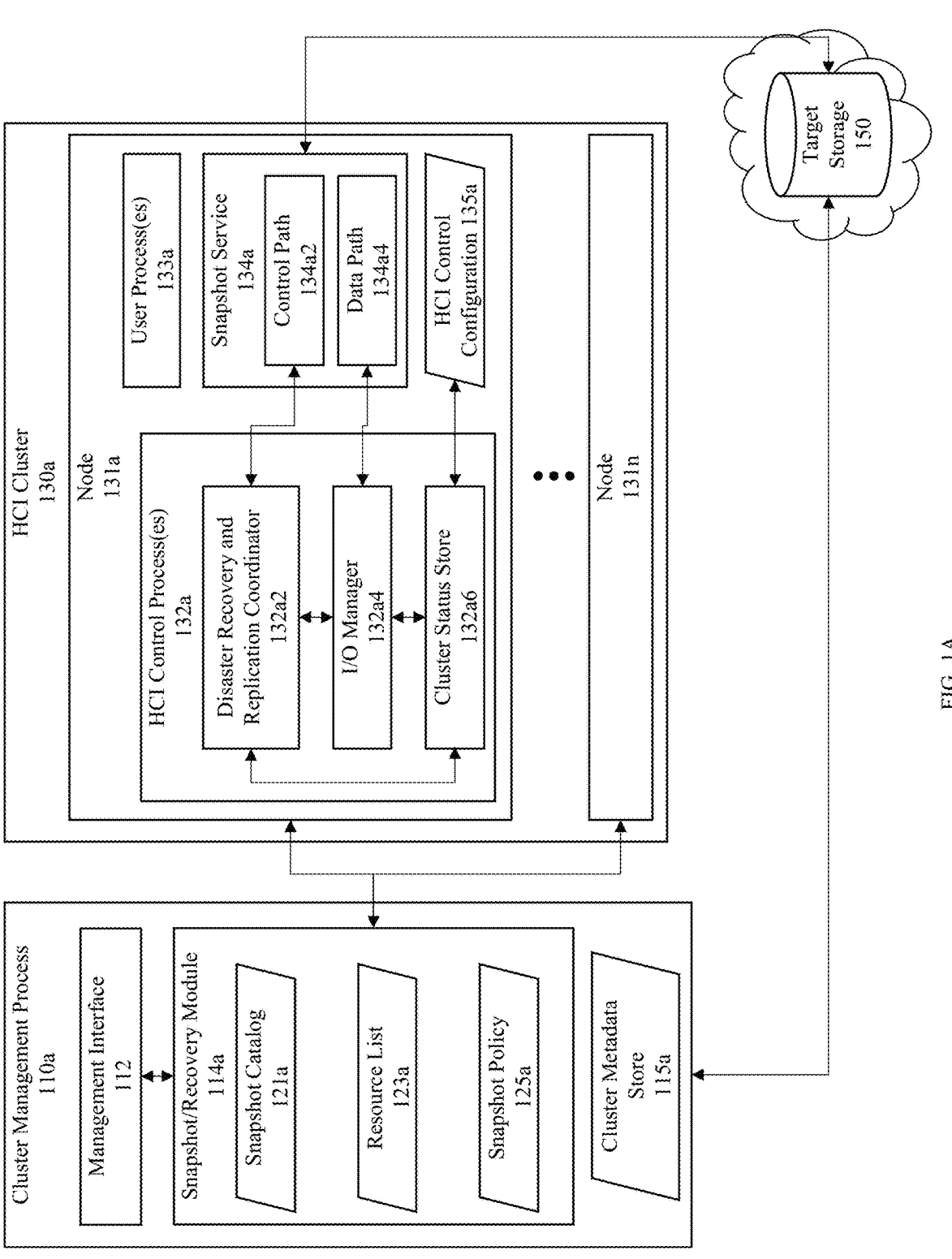
FIG. 1A illustrates a computing environment in which techniques to perform incremental hibernate and resume of a bare metal cluster can be practiced according to some embodiments.

Aspects of the present disclosure solve problems associated with hibernation of computing resources. These problems may have been created by various computer-implemented methods for dealing with movement of data of compute clusters in the context of bare metal clouds. The figures and discussions herein present example environments, systems, methods, and computer program products for hibernating and resuming a computing cluster.
Overview Hibernate and restore functions are provided for use on certain computing clusters. Some cluster hibernate and cluster restore functions are integrated into a graphical user interface such that a customer can, with a single click, hibernate multiple processes, or even all processes, of a computing cluster. Such an approach can be used to unable the release of corresponding computing resources, and thus stop the cluster from incurring at least some resource usage costs that are tallied by the computing resource provider.

Upon a user indication, a restore facility brings multiple or even all processes back to the cluster. In some embodiments, the processes can be brought back to the cluster before all their underlying data has been brought back using an instant restore approach. Such an approach is highly applicable to clusters that are constructed from bare metal nodes from a third-party provider. The approach may also be applicable to on-premises clusters even though it may be simpler to shut down a cluster and then later restart the cluster using the very same hardware that has since been in a powered down state. However, merely shutting/powering down a cluster does not provide all the benefits because the approach where the cluster is powered down does not allow that hardware to be used for other purposes.

Unlike on-premises (i.e., on-prem) clusters, it often happens that cloud clusters are ephemeral. That is, for an on-premises cluster a shutdown of that cluster or a node instance can be followed by a restart of the 'same' cluster or node instances on the same hardware (e.g., stopping software/services or physically shutting down the underlying machines does not modify the configuration but instead merely stops the operation of that configuration until restart occurs). However, for cloud clusters, such as when a cluster is restarted, the node instances would not have the same 'old' data in the same state as it was prior to the shutdown. This is because the new cluster or node instances are brought-up on pristine, data cleaned hardware and thus, all the disks would contain 'nulled-out' data. This is true even if the hardware happens to be the same hardware. This makes sense since the underlying hardware that makes up the cloud cluster is generally utilized to support different clients at different times, and as such the hardware must be purged of potentially sensitive information prior to their use by a different user. In order to provide a reliable and simple process for this, cloud clusters normally remove all user data when a customer releases any corresponding hardware.

A hibernate function of a computing cluster, as provided herein, initiates activities to generate snapshots corresponding to any to be hibernated processes where those snapshots capture the state of any resources (e.g., storage volumes such as vDisks) used by those hibernated processes. Such an approach can even be applied to the processes that are used to form the collection of nodes (e.g., bare metal nodes) into a cluster by capturing the configuration of those nodes, and even of a cluster management process or interface.

Similarly, a restore function of the computing cluster can initiate restore operations to bring the processes back online such as by restoring the configuration of any underlying nodes, and by restoring processes associated with the cluster (e.g., possibly on the same nodes). In some embodiments, the restoration process can execute an instant restore process to enable processes to begin operation even before their corresponding resources have been restored.

Definitions and Use of Figures

Some of the terms used in this description are defined below for easy reference. The presented terms and their respective definitions are not rigidly restricted to these definitions-a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments-they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A illustrates a computing environment in which techniques to perform incremental hibernate and resume of a bare metal cluster can be practiced according to some embodiments. As an option, one or more variations of the computing environment or any aspect thereof may be implemented in the context of the architecture and functionality of the embodiments described herein and/or in any environment.

As illustrated, the computing environment comprises a cluster management process 110a, a hyper-converged infrastructure (HCI) cluster 130a, and a target storage location connected over a communications interface (e.g., a network). Generally, the cluster management process 110a monitors the HCI cluster and provides a management interface for the cluster. Such a process may operate on separate hardware from the hardware of an HCI cluster or on shared hardware within the HCI cluster. As illustrated here, the cluster management process is separate from the cluster. In some embodiments, the cluster management process manages multiple HCI clusters (see e.g., FIG. 1B). At a high-level, the HCI cluster is a software defined infrastructure that virtualizes all or nearly all of the elements of conventional systems include processing, memory, networking, and storage. In some embodiment, the underlying hardware of the HCI (e.g., the nodes) contain both processing and storage capabilities such as a central processing unit (CPU), Memory (such as DRAM), and storage (e.g., SSDs and HDDs). Further, the storage from multiple nodes can be logically combined by those nodes to form a storage pool on which containers and volumes can be formed for processes that execute on those nodes. This is in contrast to the traditional approach to computing infrastructure, where the servers (which are primarily for processing) are connected to networking/switching components for routing communications to and from a storage appliance (e.g., a storage area network (SAN)). Benefits of using an HCI arrangement include the ability to scale more easily as computing and storage requirements grow. For instance, as storage requirements grow, additional or larger storage devices can be added to different servers. Additionally, since storage requirements and processing requirements often grow together, new servers can be added to increase both the computing capabilities of the HCI but also the storage capabilities—e.g., by adding storage devices in newly added servers to the storage pool. In the context of virtualization environments that are formed using software, especially those formed using bare metal nodes, one can now in theory add and remove nodes from the HCI as needed (e.g., to address over or under provisioning) thereby reducing the burden to customers for said system. The disclosure provided herein provides at least one technique to manage over and under provisioning that combines disaster recovery (DR) techniques with HCI management and provisioning techniques to improve cluster management. In some embodiments, the techniques provided herein can be used to, independently from any DR processes, to manage replication operations for the management and hibernations of processes on the cluster. In some embodiments, the DR processes and the replication operations can be one and the same in that the activities taken to replicate the processes on the cluster and the cluster configuration can be used to generate the contents needed for disaster recovery.

The cluster management process 110a includes multiple elements such as the management interface 112, the snapshot/recovery module 114, and the cluster metadata store 115a. The cluster management process provides, from a user perspective, a central location to manage a cluster (e.g., HCI cluster 130a). For instance, the cluster management process enables a user to review the state of a cluster including information such as the number of bare metal nodes, the number of virtual machines (VMs) or other virtualized entities (e.g., containers and microservices), control path information, reviewing and setting security policies, maintaining network information, etc. Such information may be maintained in a cluster metadata store (e.g., 115a) that contains relevant information for management of the cluster. In some embodiments, the cluster management process contains one or more application programing interfaces (APIs) to interface with the management/client interfaces of a cloud service provider (e.g., to provision or decommission nodes of a cluster).

The management interface 112, provides a front end for a user to manage a cluster. For instance, the management interface 112 may provide a web service that exposes control APIs to a user. In some embodiments, the control APIs are exposed using one or more conversion layers. As provided herein, one or more of the control APIs may correspond to the snapshot/recovery module 114a—to provide for the management of snapshots and enforcement of snapshot policies for a managed cluster.

The snapshot/recovery module 114a may comprise multiple elements or processes that may be accessible through the management interface 112 using one or a collection of APIs. For instance, the snapshot/recovery module might provide an interface to manage a snapshot policy (corresponding to 125a) including at least the ability to specify the creation and retention of snapshots, a location(s) where those snapshots are to be stored, and information sufficient to determine to what resources those policies should be applied. For example, the policy might specify the frequency for snapshot generation for different types of processes (e.g., user virtual machine, system/control virtual machines, containers, microservices, applications, tasks, threads, etc.), and the retention thereof at any number of locations including a target storage location that is external to the cluster (e.g., 150). In some embodiments, the snapshot policy may specify the resources that are to be snapshot instead or in addition to the corresponding processes.

In some embodiments, the snapshot policy is used by the snapshot/recovery module to analyze a resource list (see e.g., 123*a*) which associates respective processes with the resources they can access (e.g., read or write access) to determine which processes correspond to which resources and vice versa (which resources correspond to which processes). Using the resource list and the snapshot policy, the snapshot/recovery module constructs snapshot generation commands or jobs to be executed according to a schedule. For instance, the snapshot/recovery module uses the snapshot policy and the resource list to determine which resources are to be snapshot, the timing of those snapshots (e.g., the frequency of snapshot generation for each), and creates scheduled tasks to cause the generation of those snapshots. In some embodiments, the snapshot/recovery module sends one or more commands to the HCI cluster (e.g., to respective nodes therein having the corresponding resources) to generate the snapshots at the scheduled time. In some embodiments, a separate task management process sends snapshot generation commands at the relevant time. In some embodiments, the snapshot may be generated for a process that is part of a consistency group (e.g., when an underlying resource is used by multiple processes) and appropriate information may be send to the cluster to enable snapshot generation while maintaining consistency (e.g., where each member of a consistency group is confirmed to be quiesced before a snapshot of a shared resource is generated).

In some embodiments, the snapshot/recovery module maintains a snapshot catalog (see e.g., 121*a*) which may be presented to a user of the cluster management process 110*a* via the management interface 112. For instance, the snapshot catalog may identify, for each snapshot, the time of snapshot generation, the type of snapshot (e.g., full or incremental), the size of the snapshot on disk, the restore size for the snapshot, the resource(s) that were snapshot, the corresponding process(es), the location of the snapshot, the retention period, the cluster, the node(s) that the resource was on, the node where the corresponding process(es) was executing, the status of the current processes (e.g., operating normally, failed, restarting/rebooting, or hibernated), or any combination thereof.

In some embodiments, the snapshot catalog 121*a*, the resource list 123*a*, and the snapshot policy 125*a*, may be combined or maintained in any combination in the cluster metadata store. In some embodiments, the cluster metadata store, the snapshot catalog 121*a*, the resource list 123*a*, and the snapshot policy 125*a*, whether alone or in any combination, are backed up to the target storage location 150. For instance, the cluster management process may itself be associated with a management policy or snapshot schedule where the cluster management process may periodically be protected via generation of a snapshot, incremental or in full, of some or all of the data for the cluster management process. Additionally, as will be discussed herein in regard to a recovery flow, the cluster management process (or the relevant information for a to be restored cluster-see at least 121*a*, 123*a*, 125*a*, and 115*a*) can be snapshotted and subsequently recovered at a later date. For instance, as part of a multi-step recovery process, the cluster management process is recovered first, resources requirements are then determined for restoring the cluster, the determined resources are then allocated (e.g., as a number of nodes) to the cluster, the nodes of the cluster are subsequently configured using one or more snapshots, and finally user processes are restored (e.g., using an instant restore technique).

In some embodiments, the operations of the snapshot/recovery module are divided into multiple processes such as a first process for maintaining and allowing modification of the snapshot policy (see e.g., 125*a*), a second process for applying the snapshot policy to the resource list (see e.g., 123*a*) to determine which resources need to be snapshot for each process, a third process for distributing tasks to nodes in the HCI cluster and monitoring the progress of those tasks (e.g., snapshot and recovery), and a fourth process for controlling or causing the allocation and deallocation of resources to restored or hibernated processes respectively.

In some embodiments, the HCI cluster 130*a* comprises a plurality of nodes (131*a-n*) that can interoperate to form a storage pool (not illustrate in FIG. 1A) which can be used to provide the underlying storage for logical storage abstractions of processes on the cluster (e.g., disks such as vDisks, volume groups, and other containers or volumes). Generally, the storage pool is constructed and accessed using a control process (e.g., HCI control process(es) 132*a*) which can be executed on bare metal, in a container, or in a virtual machine (e.g., above a hypervisor). For instance, an I/O manager instance (see e.g., 132*a*4 and 131*a-n*) on each node in an HCI cluster can be used as a storage pool controller that uses a set of metadata to map logical addresses for processes (e.g., HCI control processes, services, or user processes) to physical addresses in physical storage devices which may be located on any node in the HCI cluster. In some embodiments, the I/O manager is modified to allow access to a storage location that is external to the cluster (see e.g., target storage 150). In some embodiments, and as illustrated here, a snapshot service is provided to enable access to the target storage location for purposes of storing snapshots and for receiving snapshot information (see snapshot service 134*a*). In some embodiments, the I/O manager 132*a*4 can be used to interface to a cluster status store 132*a*6 for access to HCI control configuration (see 135*a*) describing configuration information for the node and in some embodiments for the cluster. In some embodiments, the snapshot service can request an HCI control configuration (see 135*a*) directly from the cluster status store. In some embodiments, the HCI control configuration (see 135*a*) is embodied on a boot device of the node and is captured in a system snapshot of the node for later restoration or recovery.

In the context of the present approach provided herein, the HCI control process(es) include a disaster recovery and replication coordinator 132*a*2 which can interact with various elements within a cluster to generate a snapshot and can interact with other nodes in the cluster to maintain consistency between processes that use an underlying resource. For instance, the disaster recovery and replication coordinator can determine that a to be generated snapshot corresponds to resources that are only accessible by processes on the same node, quiesce those processes, determine a current status of any snapshots for said resource (e.g., by querying the snapshot service to retrieve any relevant information) and then instruct the I/O manage to send the corresponding information to the snapshot service for placement in a snapshot. In some embodiments, the disaster recovery and replication coordinator can coordinate with other instances of the disaster recovery and replication coordinator on other nodes to quiesce and confirm quiescence of all processes that access resources corresponding to the to be generated snapshot as a precondition to generating said snapshot. In some embodiments, the disaster recovery and replication coordinator can interface with the cluster status store (see 132a6) to generate a snapshot of the current configuration of the HCI control process(es) (see e.g., HCI control configuration 135a). In some embodiments, a snapshot of the underlying resources for the HCI control process(es) (e.g., an image or volume for HCI control process(es)) is generated. In some embodiments, a snapshot of the HCI control processes comprises a bootable image. In some embodiments, the underlying storage is from or partly from a storage attached to one or more nodes over a network (e.g., amazon elastic block storage). In some embodiments, the storage pool is formed from network attached storage that is managed together with storage devices that are locally attached to respective nodes of the plurality of nodes that form the HCI cluster.

The cluster status store 132a6 manages details about the components in the cluster such as hosts, disks, and logical components like storage containers, along with other configuration information for the nodes of the cluster (see e.g., 135a). In some embodiments, the cluster status store manages an HCI control configuration (see 135a) in a distributed manner where the configuration of the cluster can be analyzed at each node as represented by a local copy of at least some of the HCI control configuration at 135a. In some embodiments, each the HCI control configuration (see 135a) includes data that is relevant to the operation of the specific instance of the HCI control process(es).

As a general matter, each node will include one or more user process(es) (see 133a). User processes may comprise any user workloads such as virtual machines, containers, applications, microservices, and the like. These processes perform necessary work (e.g., tasks) for a user(s). However, in some instances the user process(es) may not be used for certain periods of time. As a result, it may be beneficial to hibernate the corresponding resources and shutdown some or all of those user processes. One benefit of hibernation of those processes is that it enables the reclamation of the underlying resources for use by other processes or for deallocation which can lower the cost of operation of the cluster.

The snapshot service 134a provides a front end to the target storage (see 150) for both determining the current status of any snapshots for a particular resource and for creating and retrieving snapshots. For instance, the snapshot service might comprise a microservice on the node that can be called by the disaster recovery and replication coordinator 132a2 (through a control path 134a2) to retrieve information which indicates when any prior snapshots were taken (if ever). In addition, the control path could be used to generate an empty snapshot shell for population where that shell is of the correct type (e.g., a full snapshot or an incremental snapshot as appropriate). Similarly, the I/O manager can send or received data to or from the target storage location through the snapshot service. For instance, all data that is to be added to the empty snapshot shell (whether for a full or incremental snapshot) is sent from the I/O manager to the snapshot service 134a (through the data path 134a4) and then to the target storage 150. In some embodiments, the disaster recovery and replication coordinator determines, based on at least information corresponding to a prior snapshot or lack thereof, the data that the I/O managers is to send to the snapshot service. Similarly, the disaster recovery and replication coordinator can use snapshot information to determine what data should be retrieved from a previously stored snapshot at the target storage location by instructing the snapshot service to send corresponding data to the I/O manager for writing to a resource. In some embodiments, the snapshot service (see e.g., 134a) can be provided in any location that is accessible to the cluster—e.g., on a node that is accessing a snapshot service instance, a virtual machine, on a different node from the one accessing a snapshot service instance, within or external to the cluster in which nodes access a snapshot service instance, or any combination thereof. In some embodiments, a snapshot service instance provides access to multiple nodes, even in multiple clusters. In some embodiments, one or more nodes each provide multiple snapshot service instances for providing access to one or more nodes.

The target storage may comprise any type of storage accessible over a network. For instance, the target storage may comprise a remote disk, a network attached storage, a storage area network, a private cloud storage, or a cloud disk (e.g., an amazon S3 bucket). The target storage may also comprise any of at least an object storage, block storage, or file storage.

Figure 1B:
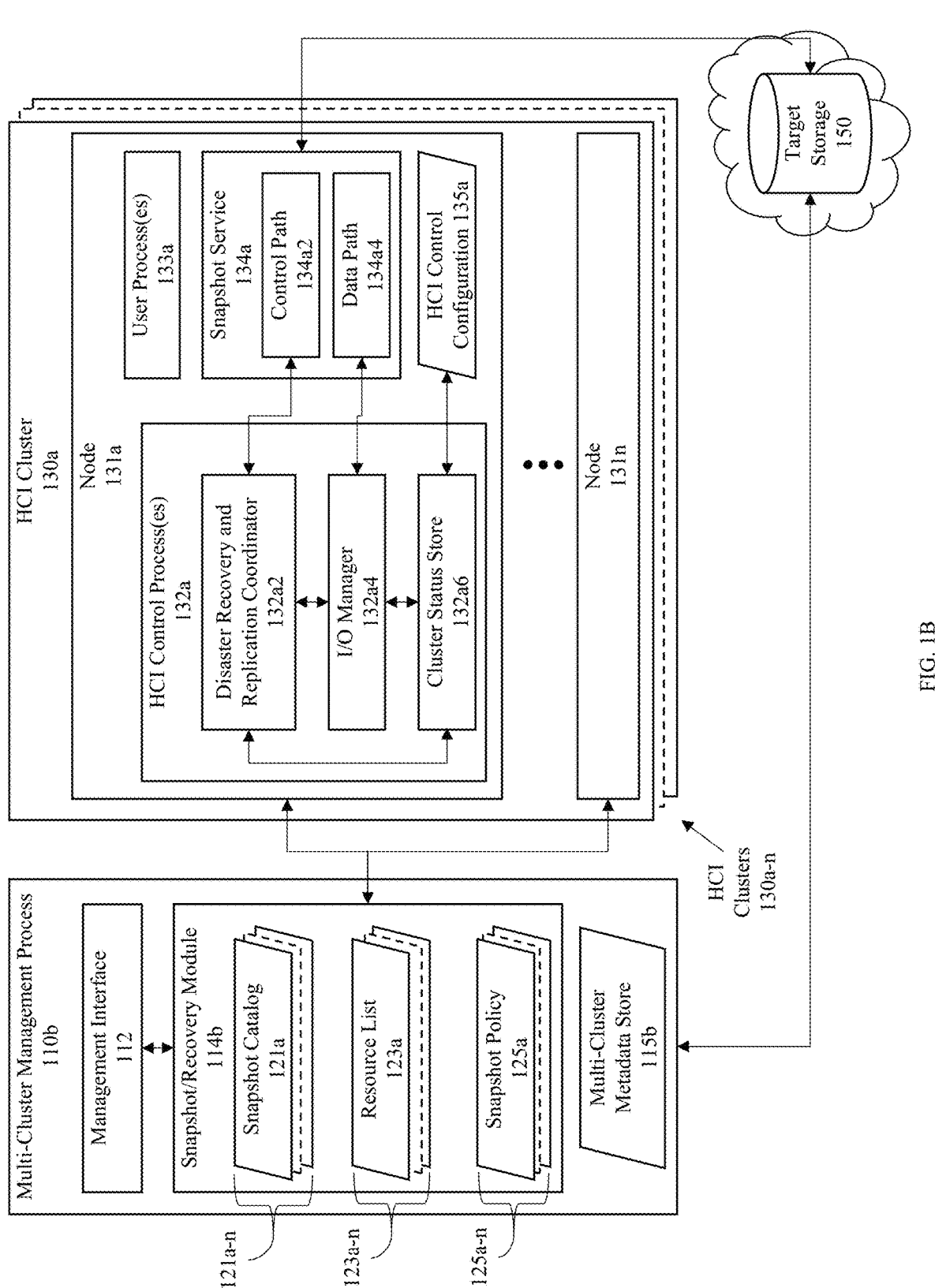
FIG. 1B illustrates a computing environment in which techniques to perform incremental hibernate and resume of bare metal clusters can be practiced according to some embodiments.

FIG. 1B illustrates a computing environment in which techniques to perform incremental hibernate and resume of bare metal clusters can be practiced according to some embodiments. Generally, FIG. 1B includes a multi-cluster management process in contrast to the single cluster management process of FIG. 1A.

In particular, instead of only one cluster (see HCI cluster 130a from FIG. 1A) there are multiple clusters (see HCI clusters 130a-n). Each cluster may be managed using the multi-cluster management process 110b which is a modified version of 110a to support multiple clusters). In particular, the multi-cluster management process 110b includes a multi-cluster metadata store 115b instead of the single metadata store of FIG. 1A wherein the information therein may be comingled or maintained separately as needed. Additionally, the snapshot recovery module can operate in the same way by maintaining different sets of data for different clusters (see e.g., snapshot catalogs 121a-n, resource lists 123a-n, snapshot policies 125a-n). Additionally, each cluster may use the same or different target storage locations for storing snapshots. In some embodiments, an HCI cluster may be implemented in a nested fashion where each node contains a parent VM in which all processes of the HCI cluster are implemented.

Figure 1C:
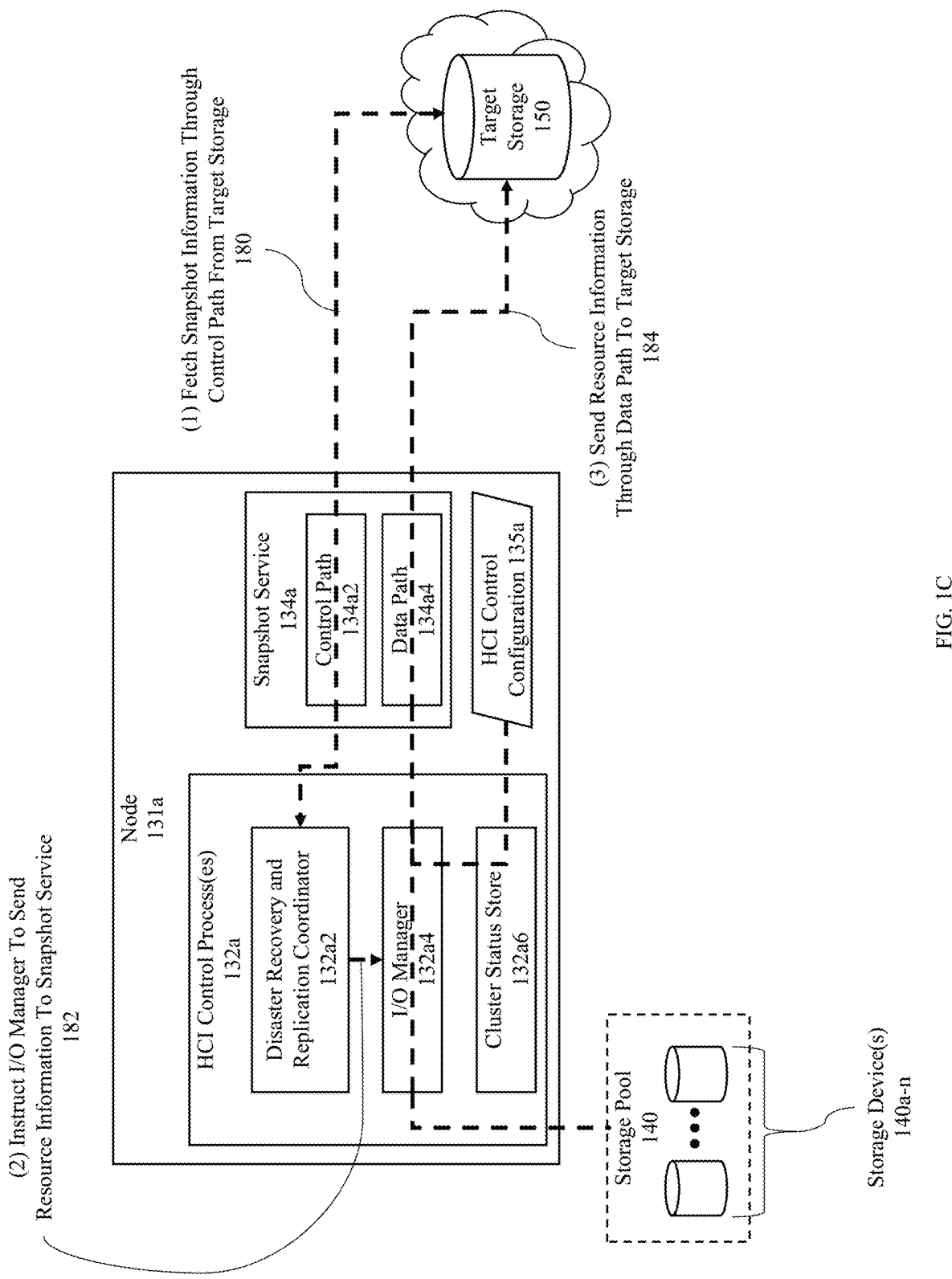
FIG. 1C illustrates a high-level flow for a snapshot generation process for a node of a clustered virtualization environment according to some embodiments.

FIG. 1C illustrates a high-level flow for a snapshot generation process for a node of a clustered virtualization environment according to some embodiments.

As illustrated, node 131a is the same as node 131a in FIGS. 1A and 1B except for the addition of an illustration of a high-level flow for implementing the approaches provided herein. Generally, the node will fetch snapshot information through the control path of the snapshot service (see 134a2 and 180). For instance, the disaster recovery and replication service may identify a snapshot by the process(es) or resource(s) that the snapshot is to capture. The snapshot service applies a set of logic (e.g., naming or storage rules) to query the target storage (see 150) to retrieve information that indicates whether there are any existing snapshots therein that correspond to the identified process(es) or resource(s) and provides the associated details. The retrieved information is then provided to the disaster recovery and replication service. The disaster recovery and replication service then determines the state of any snapshots at the target storage location and instructs the I/O manager to send the relevant resource information (e.g., data) to the snapshot service (see 182). For instance, when the disaster recovery and replication service determines that there are no full snapshots at the target storage, the disaster recovery and replication service instructs the I/O manager to send all of the data of the resource. However, when the disaster recovery and replication service determines that there is a full snapshot, the disaster recovery and replication service will instruct the I/O manager to send only the data that has changed since the last snapshot for a corresponding resource (e.g., the later of any full or incremental snapshots). In some embodiments, only a full snapshot of the HCI control configuration 135a is sent because the size of the HCI control configuration may be relatively small. In some embodiments, the I/O manager accesses a storage pool (see 140) constructed from a plurality of storage devices (see 140a-n) that are local to different nodes in the HCI cluster (see e.g., 184). In some cases, some or all of the data is located on the node and the remainder is fetched from other nodes. In some embodiments, the I/O manager can be used to access the HCI control configuration (e.g., through the cluster status store 132a6) and send the data to the target storage 150 (see e.g., 184).

Figure 1D:
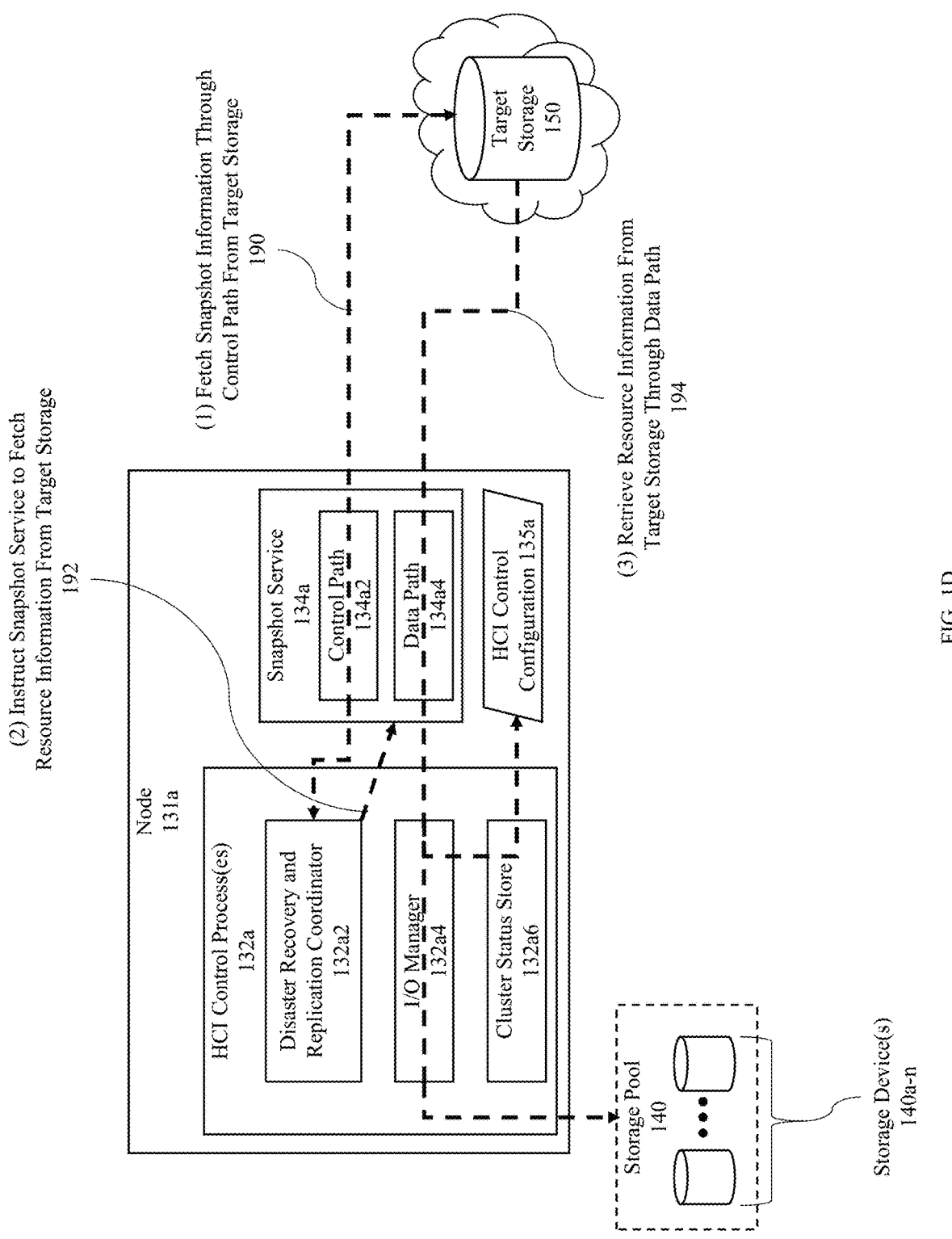
FIG. 1D illustrates a high-level flow for a snapshot recovery process for a node of a clustered virtualization environment according to some embodiments.

FIG. 1D illustrates a high-level flow for a snapshot recovery process for a node of a clustered virtualization environment according to some embodiments.

As illustrated, node 131a is the same as node 131a in FIGS. 1A and 1B except for the addition of an illustration of a high-level flow for implementing the approaches provided herein. Generally, the node will fetch snapshot information through the control path of the snapshot service (see 134a2 and 190). For instance, the disaster recovery and replication service may identify a snapshot by the process(es) or resource(s) that the snapshot captured. The snapshot service applies a set of logic (e.g., naming or storage rules) to query the target storage (see 150) to retrieve information regarding whether there is an existing snapshot therein that corresponds to the identified process(es) or resource(s) and relevant information about that snapshot(s). This information is then provided to the disaster recovery and replication service. The disaster recovery and replication service determines the state of any snapshots at the target storage location and instructs the snapshot service to fetch the relevant resource information (e.g., data) and forward it to the I/O manager (see 192) for writing to a storage location (e.g., storage pool 140 or HCI control configuration 135a). For instance, the disaster recovery and replication service instructs the snapshot service (via the data path 134a4) to restore a full snapshot, incremental snapshot, or some combination thereof (see 192), to achieve a desired recovery state (e.g., to restore a resource(s) to a point in time closest to but not after a corresponding time). In some embodiments, the HCI control configuration 135a is restored prior to retrieving any other snapshots (e.g., to bring up the node to a point where it is configured to be part of the HCI cluster). In some embodiments, only a full snapshot of the HCI control configuration 135a is retrieved because the size of the HCI control configuration may be relatively small. In some embodiments, the I/O manager writes received data to a storage pool (see 140) constructed from a plurality of storage devices (see 140a-n) that are local to different nodes in the HCI cluster (see 194).

FIG. 2 illustrates a flow for a technique to perform incremental hibernate and resume of bare metal clusters according to some embodiments. Generally, the flow operates in a scheduled manner to perform ongoing operations to maintain snapshots for at least disaster recovery purposes. However, in the event of an out of order (e.g., asynchronous) hibernate command, the system can leverage the disaster recovery operations to quickly hibernate processes of a cluster.

The process starts at 200 where disaster recovery and hibernation parameters are configured. For instance, the disaster recovery and hibernation parameters might comprise a frequency and location for generation of a snapshot, a type of snapshot to be generated, any corresponding resources or processes, a cluster identification, a node identification, rules to determine any of the parameters, or some combination thereof.

At 210, disaster recovery operations and hibernation parameters can be enforced. For instance, the disaster recovery parameters can be analyzed to determine what snapshots to generate, where to generate those snapshots, and the frequency of the generation of those snapshots. Such operations can then be scheduled using normal scheduling techniques (e.g., as snapshot events). After which, upon occurrence of a scheduled snapshot event, the process causes the creation of a corresponding snapshot. For instance, for each process that supports being snapshot, the process might trigger the creation of a snapshot every hour at 212. On the first such occurrence, the snapshot would comprise a full snapshot. In some embodiments, on subsequent occurrences, the snapshot comprises an incremental snapshot. In some embodiments, a cluster configuration may be captured either at the cluster management level or at the level of a node (see e.g., 214). For instance, each snapshot for the configuration of each node in the cluster might be generated. In some embodiments, a snapshot of a configuration for a cluster management process is also captured. In some embodiments, the scheduled disaster recovery snapshotting operations (see 210) can be repeated as indicated by the schedule.

In some embodiments, a hibernate command may be received at 220, after an initial snapshot is generated for each process in the cluster. In some embodiments, a hibernate command is received prior to completion of all full snapshots. As provided herein, the hibernate command identifies one or more processes of the cluster that are to be hibernated. For instance, a user may select processes to be hibernated due to a lack of use of those processes, a system may apply a rule to identify one or more processes that should be hibernated (e.g., based on type and usage data), or all processes that support hibernation may be selected for hibernation.

In response to the hibernation command, the process performs asynchronous hibernate command processing at 230. Functionally, this is very similar to the operations of 210, where one or more snapshot generation tasks are scheduled. However, after a snapshot is generated, the corresponding processes are shut down at the live cluster. For instance, an incremental snapshot of each of the multiple processes identified by a hibernate command is generated at 232, and a configuration snapshot is taken at 234 (to preserve the configuration state at the time of hibernation). Subsequently, post hibernation resource management is performed at 240. Such post hibernate resource management services cleanup after any hibernated processes as will be discussed herein.

Figure 3:
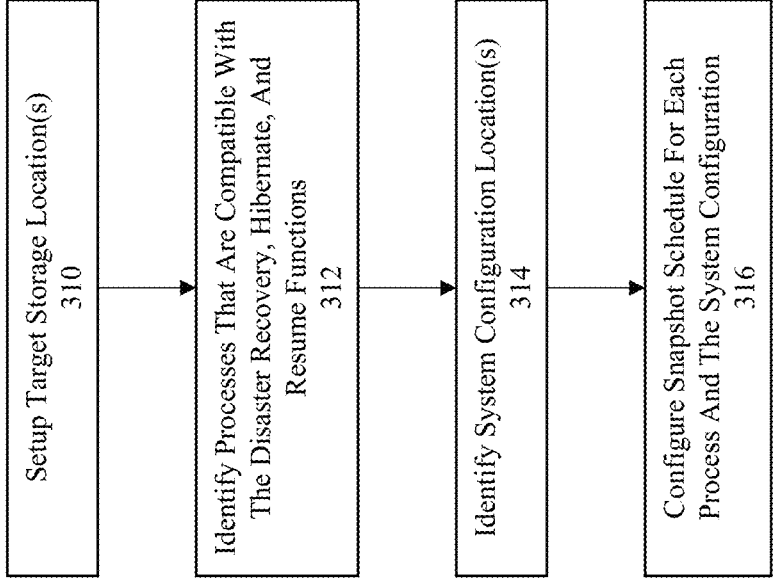
FIG. 3 illustrates an example flow for configuring disaster recovery and hibernation parameters according to some embodiments.

FIG. 3 illustrates an example flow for configuring disaster recovery and hibernation parameters according to some embodiments.

Generally, the process starts at 310 where the target storage location is set up. Essentially, to store a snapshot in a way that said snapshot (or the data thereof) can be removed from the cluster, that data must be reproduced at another location. As provided herein, that other location may be another cluster, a network attached storage device, a store area network, a remote disk, or even a cloud disk (e.g., an Amazon S3 bucket(s)).

At 312, the processes that are compatible with the disaster recovery, hibernate, and resume functions are identified. For instance, each process executing in the cluster may be marked (either in advance or based on process type) as supporting some or all features of the approach. In some embodiments, a set of data is maintained that identifies which processes are currently being managed using the approach. For instance, the snapshot catalog (121a) maintains a list of processes on the cluster including at least an identification of which processes can be protected as provided herein.

At 314, system configuration locations are identified. In some embodiments, the system configurations are maintained on one or more respective boot drives or one or more corresponding bare metal nodes. In some embodiments, the system configurations may comprise data on a storage pool or a combination of shared data (e.g., with other nodes of the cluster) and data local to a respective node. In some embodiments, system configuration data is maintained in a storage service attached to the node (e.g., a storage service accessible over a network). In some embodiments, a cluster ID, node ID, and Device ID may be combined to uniquely identify the configuration information. In some embodiments, each resource may be uniquely identified by a cluster ID, node ID, Device ID, and a volume or volume group ID including the configuration location and the user volumes.

At 316, the snapshot schedule is configured for each process of the system that is supported as indicated by a snapshot policy. For instance, the process may analyze a resource list against a snapshot policy to determine when each volume should be scheduled for snapshot generation.

Figure 4:
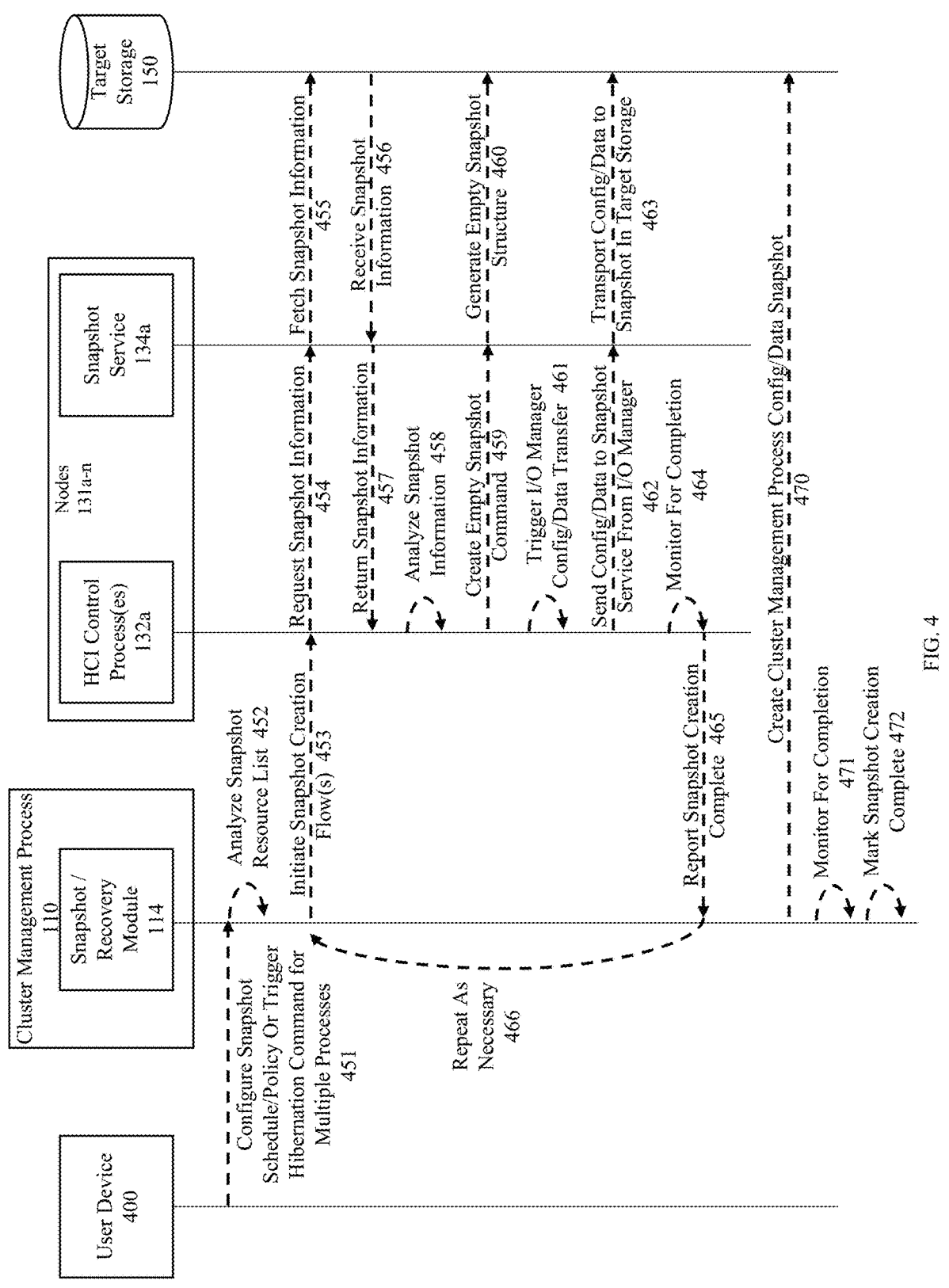
FIG. 4 illustrates an example flow for a technique to perform incremental hibernate and resume of bare metal clusters according to some embodiments.

FIG. 4 illustrates an example flow for a technique to perform incremental hibernate and resume of bare metal clusters according to some embodiments. More specifically, FIG. 4 illustrates a flow of actions that may be executed to prepare for hibernation and hibernate a cluster, or subset thereof.

The process generally starts when a user uses a user device (see 400) to configure a snapshot schedule/policy, or at a later date triggers a hibernation command for multiple processes (see 451) which is sent to a snapshot/recovery module 114 (See e.g., 114a and 114b) of the cluster management process 110 (See e.g., 110a and 110b).

In response, the snapshot/recovery module 114 analyzes the resource list at 452, possibly based on a snapshot policy (see e.g., 125a-n). Based on that analysis, the snapshot/recovery module 114 initiates a snapshot creation flow(s) at 453. For instance, the snapshot/recovery module 114 may generate and transmit a message for each node in the cluster identifying a process or resource that is to be snapshot or hibernated. Received messages may be placed in a task/job queue for processing by each respective node (see e.g., nodes 131a-n).

Each node will then perform the necessary tasks to generate a snapshot (whether that is a full snapshot or an incremental snapshot). For instance, the HCI control process (es) (see e.g., 132a) will request snapshot information from the snapshot service 134a (see 454) which will then fetch the requested information from a target storage location 150 (see 455). The snapshot service receives (see 456) and returns that snapshot information (see 457) to the requesting HCI control process(es) which then analyzes the information to determine which type of snapshot(s) need to be created (see 458) and the corresponding data. Subsequently, the requesting HCI control process(es) will generate a command to create an empty snapshot (see 459) that is to receive the snapshot data, and that command will then be processes by the snapshot service to form the necessary structure (see 460). Subsequently, the requesting HCI control process(es) will send a command to the relevant component or components to send the appropriate information (e.g., configuration information or data) to the snapshot service. For instance, the I/O manager might be used to retrieve data from a storage pool and transmit it to the snapshot service at 462 which will intern transport that information to the created empty snapshot in the target storage (see 463). The HCI control process(es) will then monitor the process for completion at 464 and may additionally mark the snapshot as read only once completed along with reporting said completion to the snapshot/recovery module at 465. The process may also be repeated as necessary (see e.g., 466).

In some embodiments, the cluster management process is protected using the same target storage. For instance, the cluster management process might create a configuration and or data snapshot at the target storage location (see 470, 471, and 472).

Figure 5:
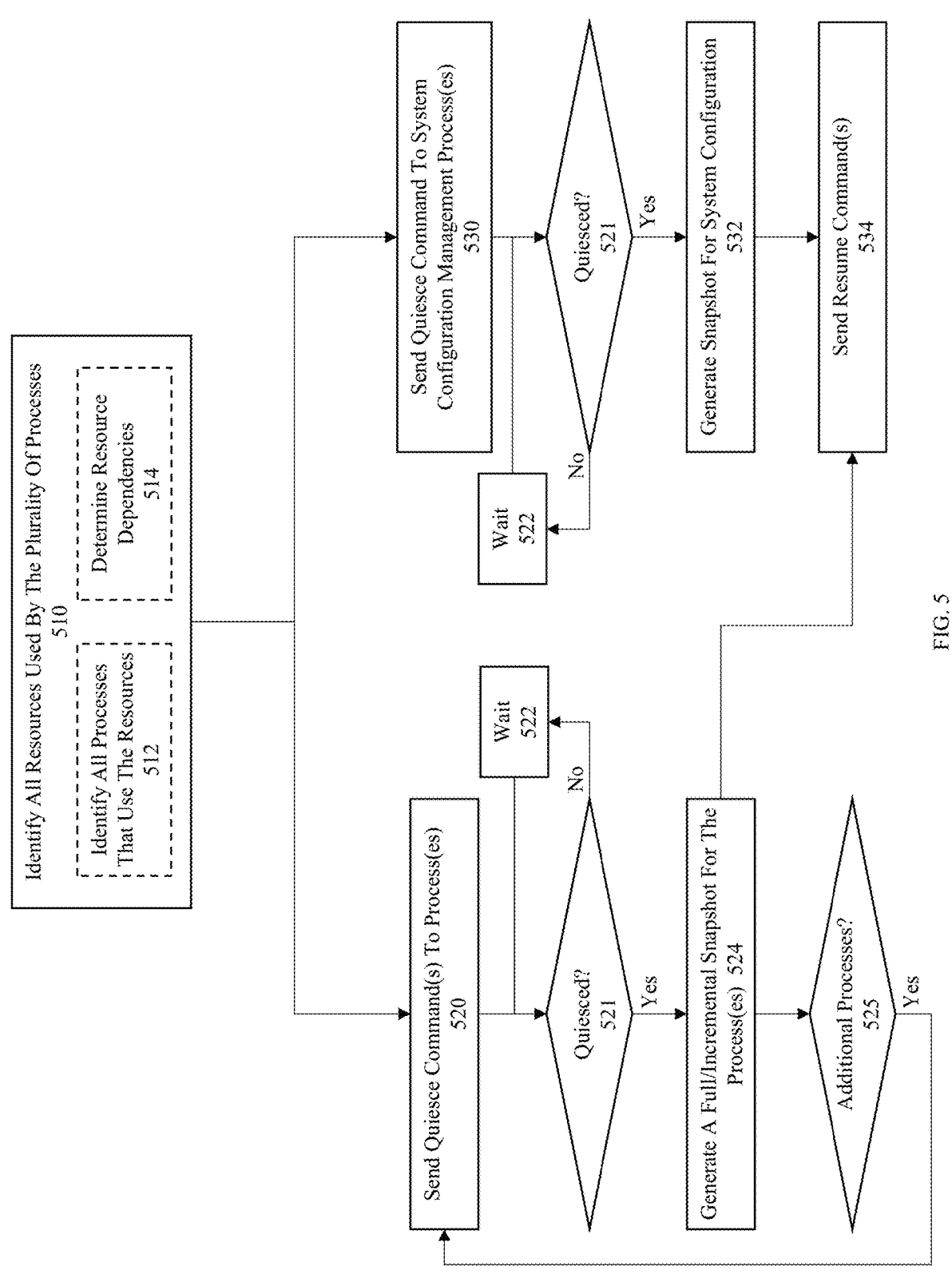
FIG. 5 illustrates an example flow for perform scheduled disaster recovery snapshotting operations according to some embodiments.

FIG. 5 illustrates an example flow for perform scheduled disaster recovery snapshotting operations according to some embodiments. This figure illustrates only some approaches to generate a snapshot(s) and other approaches could be utilized herein.

The process starts at 510 where all the resources used by processes to be snapshot are identified. For instance, if a snapshot is to be generated for a process, the resources used by that process are identified. In some embodiments, there may be other processes that use the same resources which may be determined at 512. In some embodiments, those resources may also depend on one or more other resources which may be determined at 514. In the event that a resource of the process is used by another process or that the resource has a dependency on another resource, the snapshot will be generated as a group (e.g., a consistency group) where all the other processes and resources must be brought to a stable consistent state prior to snapshot generation—e.g., by quiescing the group.

The processes of any particular resource for which a snapshot is to be generated are sent a quiesce command at 520. Such commands general halt the execution of additional operations that could modify the underlying resources—e.g., while a read operation may be permitted by a quiesced process, an operation that changes any information on the resource is not (e.g., delete, update, and write are not permitted when a process is quiesced). Successful quiescing can be confirmed at 521 or a wait period can be applied at 522. Quiescing may be completed using various techniques. For instances, process may be quiesced by sending a quiesce command to applications that support it, to wrappers that encompass those processes (e.g., nodes, hypervisors, virtual machines, containers, or services) or through a storage management element in the storage path (e.g., within a virtualized controller or I/O manager). Such, processes may be considered to be at the user level (e.g., user VM, container, or service) or at an intermediate level (e.g., Microsoft volume shadow service), and may be controlled through a set of guest tools (e.g., guest tools installed on a virtual machine).

Once a process or consistency group thereof is quiesced, a snapshot can be generated at 524. In the even that it is the first snapshot for the process or consistency group then the snapshot will be a full snapshot. However, any subsequent snapshot will normally be an incremental snapshot (e.g., one which includes only changes since the last snapshot, whether full or incremental). In some embodiments, snapshot generation comprises at least flushing any quiesced process write queues/caches to disk, marking the snapshot as read only, and generating a list of items in the snapshot.

Once a snapshot has been generated for a process or consistency group thereof, a resume command may be sent at 534. If there are additional processes that are pending snapshot generation, the process may return to 520.

In some embodiments, a separate flow may be maintained for generation of system configuration management processes to capture the configuration of the cluster at 530. Such processes are essentially the same but the information that is collected may be maintained in separate or specialized structures (see e.g., 521, 522, 532, and 534). As provided herein, the frequency of the generation of snapshots for different processes may be different, including the snapshots generated to capture the system configuration of the HCI cluster management processes.

Figure 6:
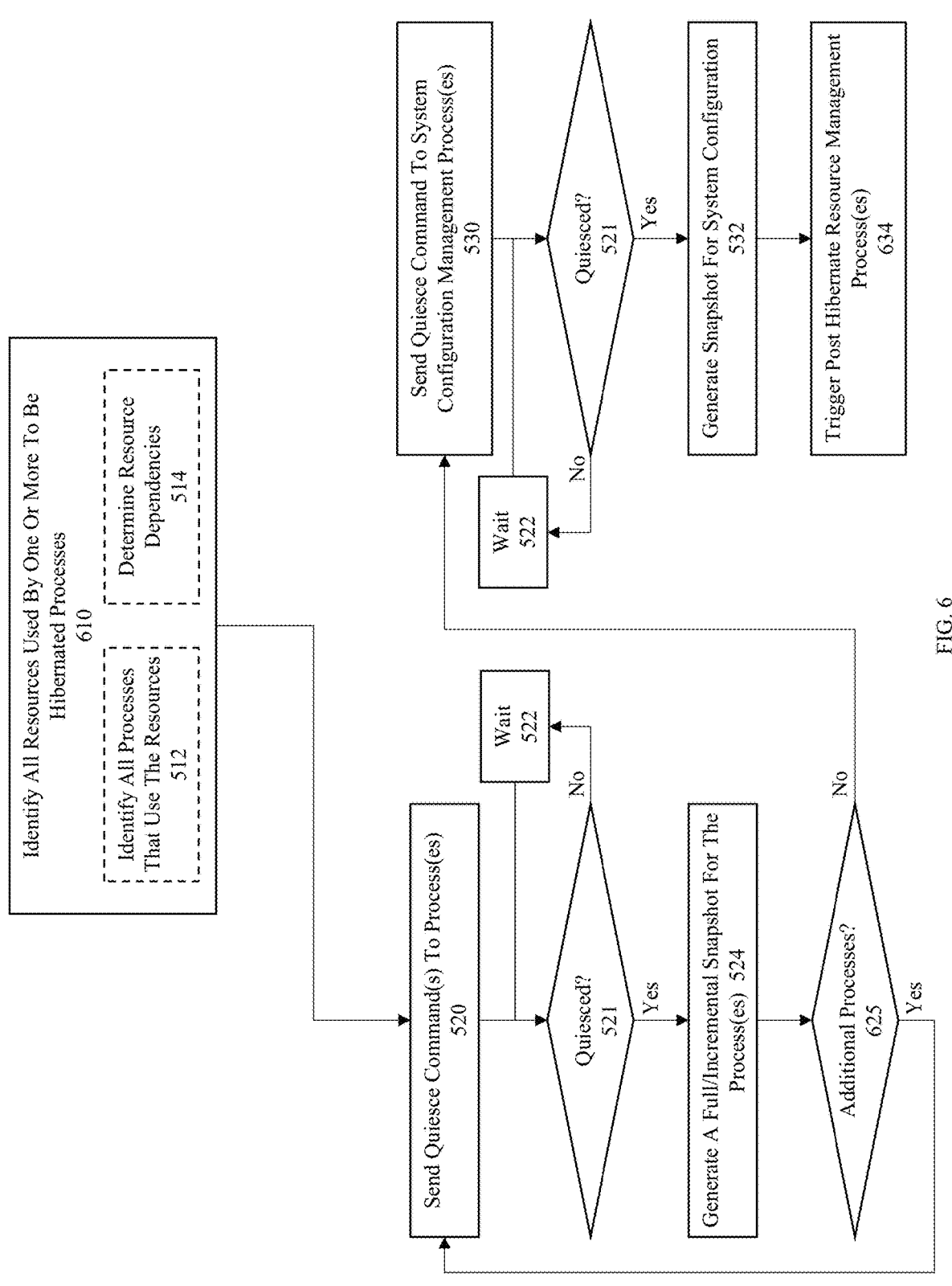
FIG. 6 illustrates an example flow for performing asynchronous hibernate command processing according to some embodiments.

FIG. 6 illustrates an example flow for performing asynchronous hibernate command processing according to some embodiments.

Generally, the process for FIG. 6 is largely the same as for FIG. 5 with like identified elements being the same (see 512, 514, 520, 521, 522, 524, 530, and 532). However, at 610, the resources being identified are not necessarily all resources, but may instead be only those corresponding to processes that are to be hibernated. Additionally, whereas in FIG. 5 the system configuration snapshot generation was separate from the process snapshot generation, in FIG. 6 the two are linked (see connection between 625 and 530) so that the process and configuration snapshots can be captured at functionally the same time. This is to ensure that any restoration of the process can be associated with corresponding configuration parameters without which the recovery may fail. In some embodiments, the system configuration snapshot is generated before user process snapshots. Finally, instead of resuming all snapshotted processes, post hibernation processing is triggered at 634.

Figure 7:
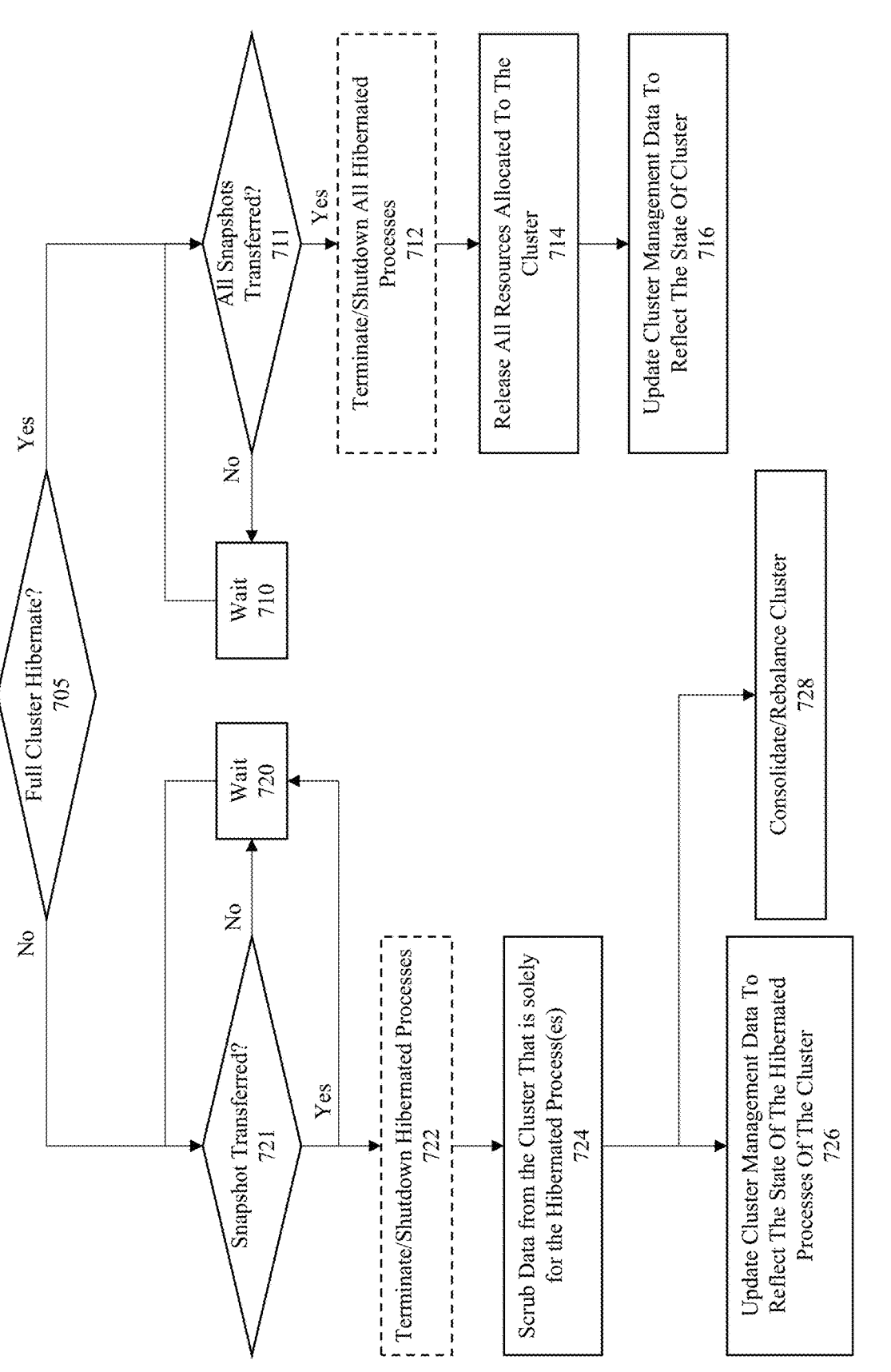
FIG. 7 illustrates an example flow for post hibernate resource management processing according to some embodiments.

FIG. 7 illustrates an example flow for post hibernate resource management processing according to some embodiments.

Generally, the process starts by determining whether the current hibernate operations are part of a full or a partial cluster hibernation (see 705). Depending on the outcome, one of two paths is taken.

If the process is part of a full hibernation, the flow will proceed to 711 where it is determined whether all the snapshots have been transferred to the target storage. The process waits for a period of time at 710 when snapshots are still in the process of being transferred. For instance, the snapshots may be generated by marking items (e.g., extents or extent groups) of a snapshotted resources as read only and creating a collection of hard links to those items (e.g., the extents or extent groups). In this way a snapshot can be generated very quickly on the HCI cluster because the data is not reproduced but is instead only marked as being read only. However, once generated a snapshot will need to be reproduced at the target storage location to achieve the desired redundancy. In some embodiments, prior to hibernation of a process, the approach first reproduces the corresponding snapshot at the target location. Once all the snapshots have been transferred all hibernated processes are terminated (see 712).

Subsequently all resources allocated to the cluster are released at 714, and management data is updated to reflect the state change of the cluster at 716 (e.g., in the cluster management process). In some embodiments, the cluster management process may also be hibernated if no other clusters are managed by that process.

In contrast, if only a portion of the cluster is to be hibernated the overall footprint (and therefore burden) of the cluster can be decreased as the corresponding snapshots are reproduced at the target location. For instance, at 721 a determination is made as to whether any snapshots have been transferred. For snapshots that have been transferred the process continues at 722. However, the process also proceeds to 720 where a period of time is waited before making the determination at 721 again.

After a snapshot is determined to be transferred (see 721) the corresponding process(es) are terminated at 722. Once terminated, the data of the hibernated process(es) is scrubbed from the cluster (see 724)—e.g., the extents or extent groups for those hibernates processes can be removed from the storage pool. This will decrease the amount of used space therein. Subsequently, the cluster management process may execute rebalancing operations to consolidate the cluster. For instance, at 728 user processes and cluster services that remain can be combined onto fewer nodes; data from nodes without services can be moved to nodes with services; and nodes that no longer have data or execute necessary processes for the cluster can be released back to a pool of available resources (e.g., back to a cloud service provider). Additionally, at 726, the cluster management process is updated to reflect the state of the hibernated processes of the cluster.

FIG. 8 illustrates a flow for a snapshot recovery process for a clustered virtualization environment according to some embodiments. As an option, one or more variations of the computing environment or any aspect thereof may be implemented in the context of the architecture and functionality of the embodiments described herein and/or in any environment.

The process generally starts when a command to restore multiple processes of the plurality of the fully or partially hibernated cluster is received at 802. For instance, a user might access the cluster management process to select one or more processes to restore on the cluster (e.g., using a snapshot catalog at 121*a*). In some embodiments, the user may select a specific snapshot or time from which to the restore the process(es). In some embodiments, if a specific snapshot or time is not selected the process will restore the latest corresponding snapshot.

Once the process(es) to be restored are identified the flow determines where to allocate resources for those process(es) to be executed and corresponding resources for storing their associated data based on requirements of those processes (see e.g., 804 and 806). In some embodiments, the resources are selected from nodes that are already part of the cluster. In some embodiments, new nodes are provisioned and added to the cluster.

Once selected, the resources are configured for the restoration of the hibernated processes at 808. In some embodiments, an initial configuration is a placeholder until a full configuration is retrieved and applied to the node such as at 810 (e.g., before an HCI control configuration snapshot is retrieved and applied to the node). In some embodiments, the restoration of the data is initiated at 810. For instance, any necessary cluster management information is transferred first, followed by configuring allocated and/or selected resources for execution of user processes to be restored. In some embodiments, the user processes are essentially instantly accessible by identifying the storage location (e.g., the location that the snapshots were stored) as a location of a first replica (or read only copy). In some embodiments, the restoration of the data is executed as a background process that identifies the storage pool (or other storage devices) as a replication location and copies the data from the backup location to the active cluster using cluster management processes. In some embodiments, the instant restore uses a copy-on-read or copy-on-write approach or process. Finally, at 812, the cluster is configured to allow access to the multiple processes, after which users can begin executing workloads.

Figure 9:
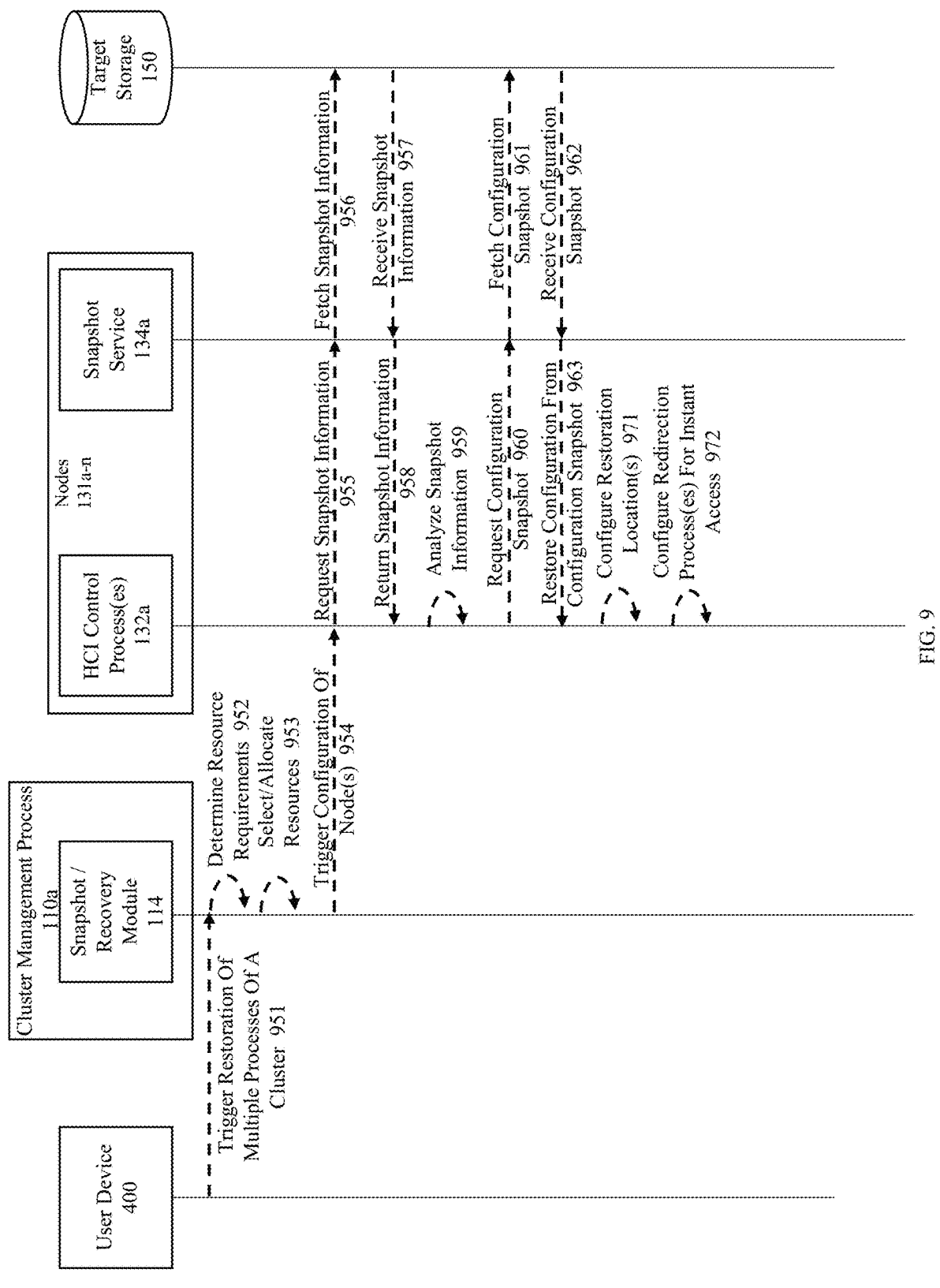
FIG. 9 illustrates an example flow for a technique to perform restoration of hibernated processes to a bare metal cluster according to some embodiments.

FIG. 9 illustrates an example flow for a technique to perform restoration of hibernated processes to a bare metal cluster according to some embodiments.

The process generally starts when a user uses a user device (see 400) to trigger restoration of multiple processes of a cluster (see 951) which is sent to a snapshot/recovery module 114 (See e.g., 114a and 114b) of the cluster management process 110 (See e.g., 110a and 110b).

In response, the snapshot/recovery module 114 analyzes the requirements of the processes to be restored (see 952) and selects or allocates resources to their restoration (see 953) using the snapshot catalog and potentially a resource list. Once, completed, the snapshot/recovery module 114 initiates configuration of nodes that are selected or allocated to the restoration (see 954) for the corresponding processes to be restored on respective nodes.

Subsequently, each node executes a process to restore the relevant snapshot(s). As illustrated here, the node may first restore a configuration snapshot (e.g., a newly allocated node). For instance, at 955 the disaster recovery and replication coordinator of the HCI control process request snapshot information from the snapshot service which fetches the information from the target storage (see 956 and 957) and returns it to the HCI control process (see 958), and analyzes that snapshot information at 959. Based on the analysis, the process then requests the configuration snapshot at 960 from the snapshot service which fetches and retrieves that information from the target storage and returns it to the HCI control process for restoration in the HCI control configuration data (see 961-963).

After the system configuration has been restored, the process configures the restoration locations (e.g., volumes) on the cluster storage (e.g., a storage pool) (see 971). Such volumes may be populated using a background process to allow access to data not yet on the storage pool by configuration a redirection process for instant access (see 972). In some embodiments, the redirection process is combined with a copy-on-read or copy-on-write approach.

In some embodiments, only process snapshots are restored, without restoring configuration snapshots, such as when a process is to be restored to an already configured node.

Further details regarding general approaches to managing snapshots are described in U.S. Pat. No. 10,489,518 titled "VIRTUAL MACHINE OBJECT VERSION CONTROL" issued on Nov. 29, 2019, which is hereby incorporated by reference in its entirety.

All or portions of any of the foregoing techniques can be partitioned into one or more modules and instanced within, or as, or in conjunction with, a virtualized controller in a virtual computing environment. Some example instances of virtualized controllers situated within various virtual computing environments are shown and discussed as pertains to FIG. 10A, FIG. 10B, FIG. 10C, and FIG. 10D.

Figure 10A:
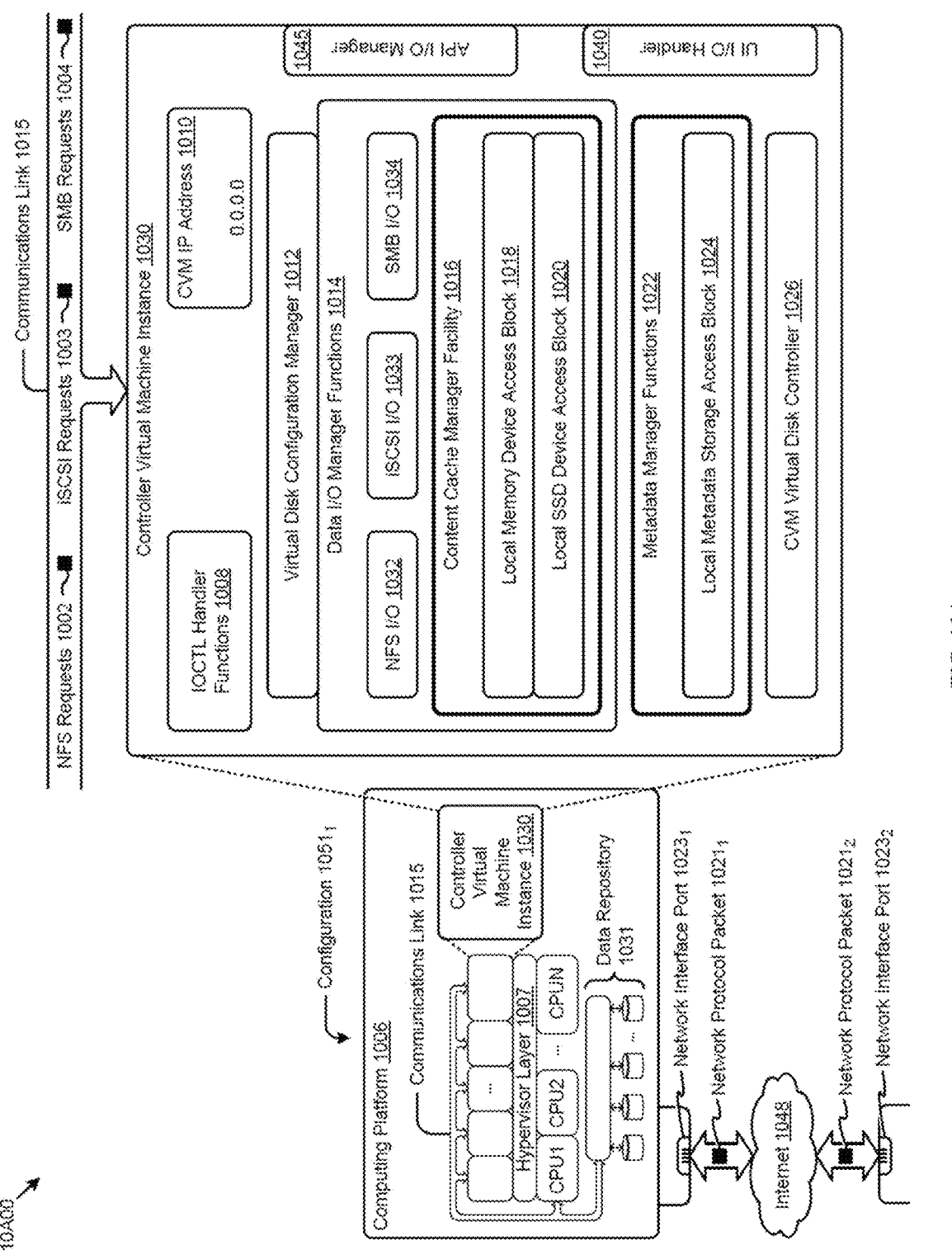
FIG. 10A depicts a virtualized controller as implemented in the shown virtual machine architecture 10A00.

FIG. 10A depicts a virtualized controller as implemented in the shown virtual machine architecture 10A00. The heretofore-disclosed embodiments, including variations of any virtualized controllers, can be implemented in distributed systems where a plurality of networked-connected devices communicate and coordinate actions using inter-component messaging.

As used in these embodiments, a virtualized controller is a collection of software instructions that serve to abstract details of underlying hardware or software components from one or more higher-level processing entities. A virtualized controller can be implemented as a virtual machine, as an executable container, or within a layer (e.g., such as hypervisor layer 1007). Furthermore, as used in these embodiments, distributed systems are collections of interconnected components that are designed for, or dedicated to, storage operations as well as being designed for, or dedicated to, computing and/or networking operations.

Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, computing and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system (OS) virtualization techniques are combined.

As shown, virtual machine architecture 10A00 comprises a collection of interconnected components suitable for implementing embodiments of the present disclosure and/or for use in the herein-described environments. Moreover, virtual machine architecture 10A00 includes a controller virtual machine instance 1030 in configuration 1051₁ that is further described below as pertaining to implementation of such a controller virtual machine instance 1030. Configuration $1051_1$ supports virtual machine instances that are deployed as user virtual machines, or controller virtual machines or both. Such virtual machines interface with a hypervisor layer (as shown). Some virtual machines are configured to process storage inputs or outputs (I/O or IO) as received from any or every source within the computing platform. An example implementation of such a virtual machine that processes storage I/O is depicted as 1030.

In this and other configurations, a controller virtual machine instance receives block I/O storage requests as network file system (NFS) requests in the form of NFS requests 1002, and/or internet small computer system interface (iSCSI) block IO requests in the form of iSCSI requests 1003, and/or Samba file system (SMB) requests in the form of SMB requests 1004. The controller virtual machine (CVM) instance publishes and responds to an internet protocol (IP) address (e.g., CVM IP address 1010). Various forms of input and output can be handled by one or more IO control (IOCTL) handler functions (e.g., IOCTL handler functions 1008) that interface to other functions such as data IO manager functions 1014 and/or metadata manager functions 1022. As shown, the data IO manager functions can include communication with virtual disk configuration manager 1012 and/or can include direct or indirect communication with any of various block IO functions (e.g., NFS 1032, iSCSI 1033, SMB 1034, etc.).

In addition to block IO functions, configuration $1051_1$ supports input or output (IO) of any form (e.g., block IO, streaming IO) and/or packet-based IO such as hypertext transport protocol (HTTP) traffic, etc., through either or both of a user interface (UI) handler such as UI IO handler 1040 and/or through any of a range of application programming interfaces (APIs), possibly through API IO manager 1045.

Communications link 1015 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random-access persistent memories (RAPMs) or optical or magnetic media drives such as paper tape or magnetic tape drives. Volatile media includes dynamic memory such as random-access memory. As shown, the detail of controller virtual machine instance 1030 includes content cache manager facility 1016 that accesses storage locations, possibly including local dynamic random-access memory (DRAM) (e.g., through local memory device access block 1018) and/or possibly including accesses to local solid-state storage (e.g., through local SSD device access block 1020).

Common forms of computer readable media include any non-transitory computer readable medium, for example, floppy disk, flexible disk, hard disk, magnetic tape, or any other magnetic medium; compact disk read-only memory (CD-ROM) or any other optical medium; punch cards, paper tape, or any other physical medium with patterns of holes; or any random access memory (RAM), programmable read-only memory (PROM), erasable programmable read-only memory (EPROM), flash memory EPROM (FLASH-EPROM), or any other memory chip or cartridge. Any data can be stored, for example, in any form of data repository 1031, which in turn can be formatted into any one or more storage areas, and which can comprise parameterized storage accessible by a key (e.g., a filename, a table name, a block address, an offset address, etc.). Data repository 1031 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 1024. The data repository 1031 can be configured using CVM virtual disk controller 1026, which can in turn manage any number or any configuration of virtual disks.

Execution of a sequence of instructions to practice certain embodiments of the disclosure are performed by one or more instances of a software instruction processor, or a processing element such as a central processing unit (CPU) or data processor or graphics processing unit (GPU), or such as any type or instance of a processor (e.g., CPU1, CPU2, . . . , CPUN). According to certain embodiments of the disclosure, two or more instances of configuration $1051_1$ can be coupled by communications link 1015 (e.g., backplane, local area network, public switched telephone network, wired or wireless network, etc.) and each instance may perform respective portions of sequences of instructions as may be required to practice embodiments of the disclosure.

The shown computing platform 1006 is interconnected to the Internet 1048 through one or more network interface ports (e.g., network interface port $1023_1$ and network interface port $1023_2$). Configuration $1051_1$ can be addressed through one or more network interface ports using an IP address. Any operational element within computing platform 1006 can perform sending and receiving operations using any of a range of network protocols, possibly including network protocols that send and receive packets (e.g., network protocol packet $1021_1$ and network protocol packet $1021_2$).

Computing platform 1006 may transmit and receive messages that can be composed of configuration data and/or any other forms of data and/or instructions organized into a data structure (e.g., communications packets). In some cases, the data structure includes program instructions (e.g., application code) communicated through the Internet 1048 and/or through any one or more instances of communications link 1015. Received program instructions may be processed and/or executed by a CPU as it is received and/or program instructions may be stored in any volatile or non-volatile storage for later execution. Program instructions can be transmitted via an upload (e.g., an upload from an access device over the Internet 1048 to computing platform 1006). Further, program instructions and/or the results of executing program instructions can be delivered to a particular user via a download (e.g., a download from computing platform 1006 over the Internet 1048 to an access device).

Configuration 1051$_1$ is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (LAN) and/or through a virtual LAN (VLAN) and/or over a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to techniques to perform incremental hibernate and resume of bare metal clusters. In some embodiments, a module may include one or more state machines and/or combinational logic used to implement or facilitate the operational and/or performance characteristics pertaining to techniques to perform incremental hibernate and resume of bare metal clusters.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of techniques to perform incremental hibernate and resume of bare metal clusters). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to techniques to perform incremental hibernate and resume of bare metal clusters, and/or for improving the way data is manipulated when performing computerized operations pertaining to incremental hibernate and resume of bare metal clusters.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT" issued on Dec. 3, 2013, which is hereby incorporated by reference in its entirety.

Further details regarding general approaches to managing snapshots are described in U.S. Pat. No. 11,829,328 titled "GARBAGE COLLECTION FROM ARCHIVAL OF STORAGE SNAPSHOTS" issued on Nov. 28, 2023, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT" issued on Oct. 1, 2013, which is hereby incorporated by reference in its entirety.

Figure 10B:
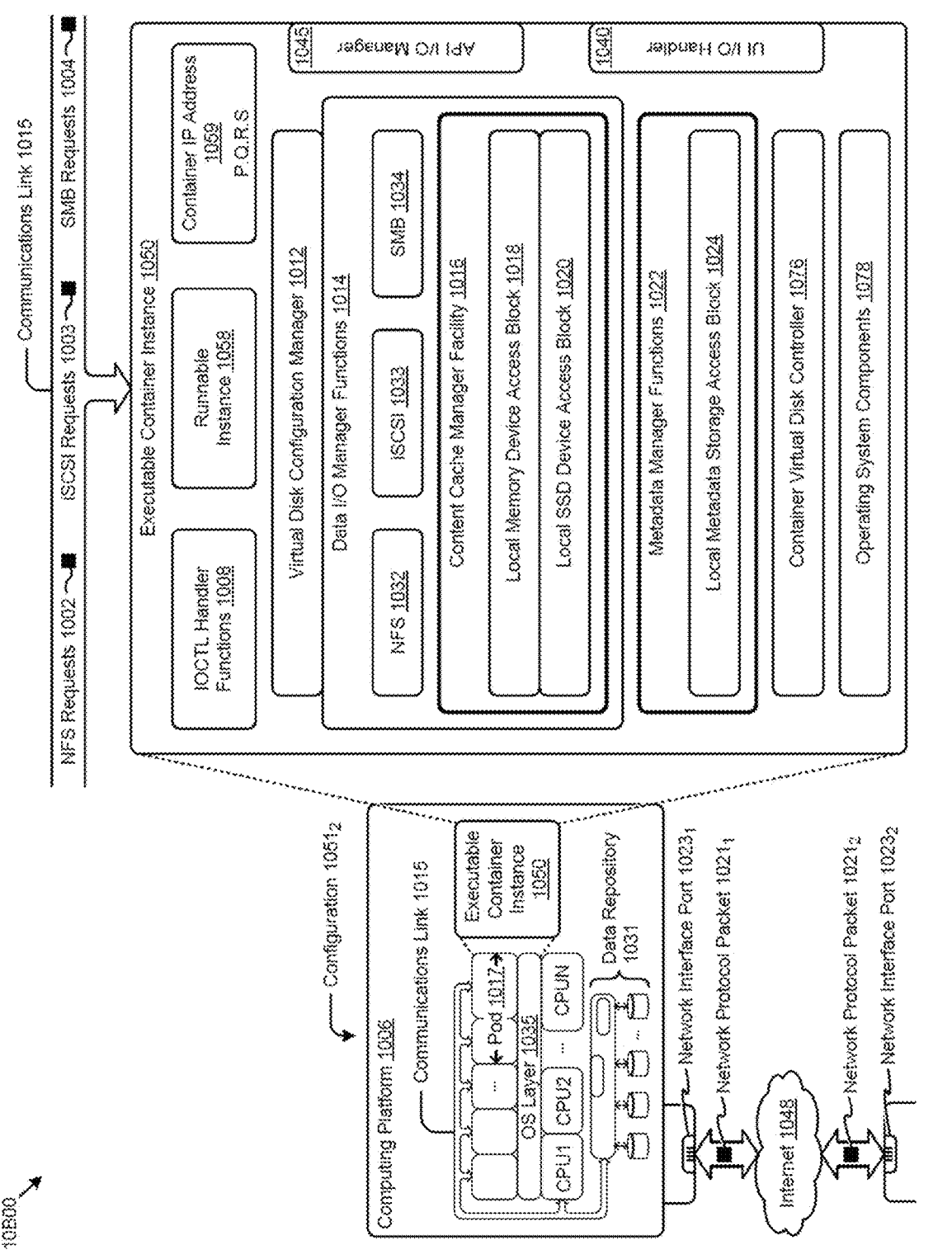
FIG. 10B depicts a virtualized controller implemented by containerized architecture 10B00.

FIG. 10B depicts a virtualized controller implemented by containerized architecture 10B00. The containerized architecture comprises a collection of interconnected components suitable for implementing embodiments of the present disclosure and/or for use in the herein-described environments. Moreover, the shown containerized architecture 10B00 includes an executable container instance 1050 in configuration 1051$_2$ that is further described below as pertaining to executable container instance 1050. Configuration 1051$_2$ includes an operating system layer (the shown OS layer 1035) that performs addressing functions such as providing access to external requestors (e.g., user virtual machines or other processes) via an IP address 1059 (e.g., "P.Q.R.S", as shown). Providing access to external requestors can include implementing all or portions of a protocol specification, possibly including the hypertext transport protocol (HTTP or "http:") and/or possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

An operating system layer (e.g., the shown OS layer 1035) can perform port forwarding to any executable container (e.g., executable container instance 1050). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a corresponding virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls", "dir", etc.). The executable container might optionally include operating system components 1078, however such a separate set of operating system components need not be provided. As an alternative, an executable container can include runnable instance 1058, which is built (e.g., through compilation and linking, or just-in-time compilation, etc.) to include any or all of any or all library entries and/or operating system (OS) functions, and/or OS-like functions as may be needed for execution of the runnable instance. In some cases, a runnable instance can be built with a virtual disk configuration manager, any of a variety of data IO management functions, etc. In some cases, a runnable instance includes code for, and access to, container virtual disk controller 1076. Such a container virtual disk controller can perform any of the functions that the aforementioned CVM virtual disk controller 1026 can perform, yet such a container virtual disk controller does not rely on a hypervisor or any particular host operating system so as to perform its range of functions.

In some environments, multiple executable containers can be collocated and/or can share one or more contexts. For example, multiple executable containers that share access to a virtual disk can be assembled into a pod 1017 (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod). In various implementations a pod represents a set of running or runnable processes. A pod can be deployed as the lowest level executable unit of a containerized application. As used herein, a pod that is instanced within a node can be addressed by a local IP address.

Figure 10C:
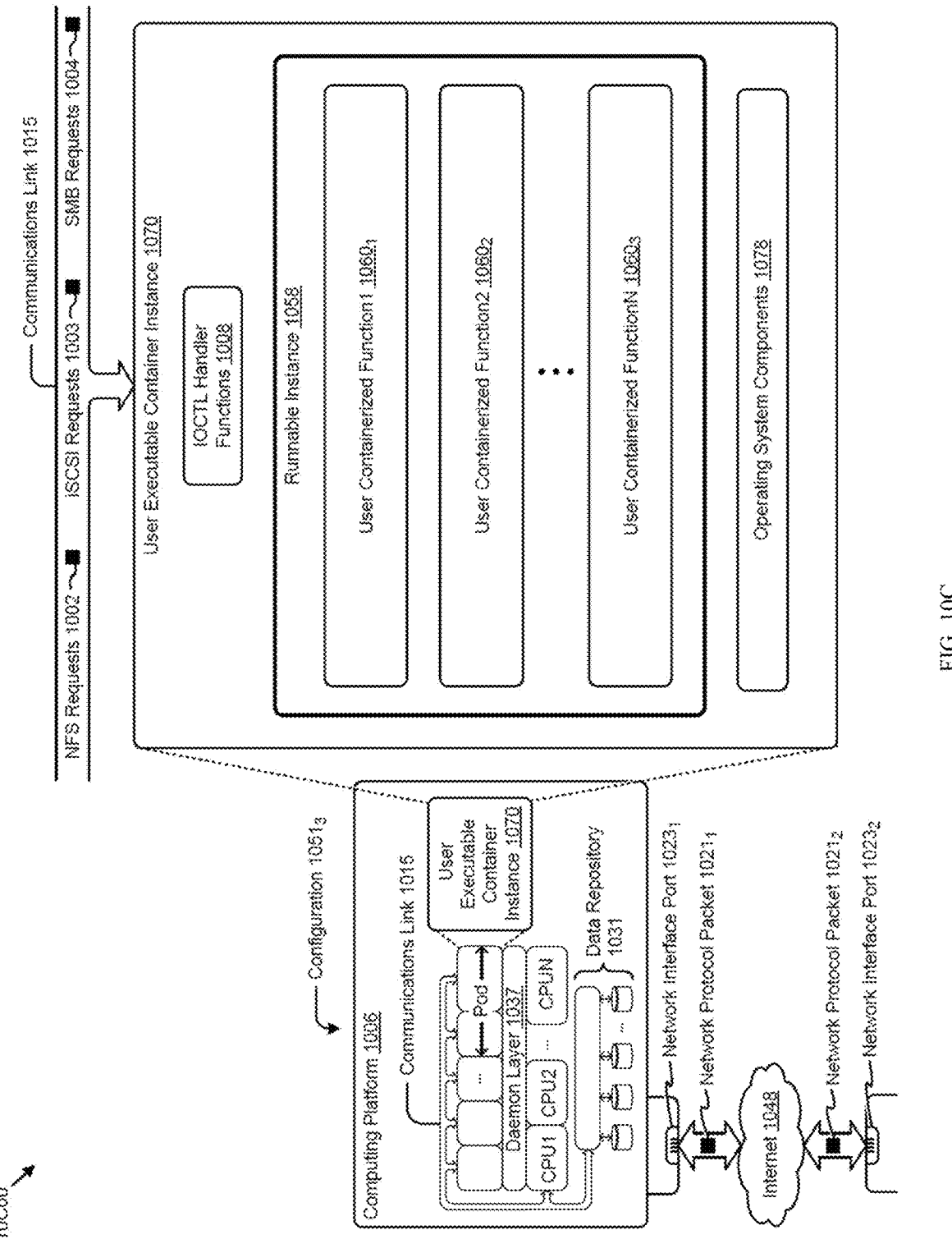
FIG. 10C depicts a virtualized controller implemented by a daemon-assisted containerized architecture 10C00.

FIG. 10C depicts a virtualized controller implemented by a daemon-assisted containerized architecture 10C00. The containerized architecture comprises a collection of interconnected components suitable for implementing embodiments of the present disclosure and/or for use in the herein-described environments. Moreover, the shown daemon-assisted containerized architecture includes a user executable container instance 1070 in configuration 1051₃ that is further described below as pertaining to user executable container instance 1070. Configuration 1051₃ includes a daemon layer 1037 that performs certain functions of an operating system.

User executable container instance 1070 comprises any number of user containerized functions (e.g., user containerized function1 1060₁, user containerized function2 1060₂, . . . , user containerized functionN 1060₃). Such user containerized functions can execute autonomously or can be interfaced with or wrapped in a runnable object to create a runnable instance (e.g., runnable instance 1058). In some cases, the shown operating system components 1078 comprise portions of an operating system, which portions are interfaced with or included in the runnable instance and/or any user containerized functions. In this embodiment of a daemon-assisted containerized architecture, the computing platform 1006 might or might not host operating system components other than operating system components 1078. More specifically, the shown daemon might or might not host operating system components other than operating system components 1078 of user executable container instance 1070.

The virtual machine architecture 10A00 of FIG. 10A and/or the containerized architecture 10B00 of FIG. 10B and/or the daemon-assisted containerized architecture 10C00 of FIG. 10C can be used in any combination to implement a distributed platform that contains multiple servers and/or nodes that manage multiple tiers of storage where the tiers of storage might be formed using the shown data repository 1031 and/or any forms of network accessible storage. As such, the multiple tiers of storage may include storage that is accessible over communications link 1015. Such network accessible storage may include cloud storage or networked storage (NAS) and/or may include all or portions of a storage area network (SAN). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor or corresponding computer modules that manages the interactions between the underlying hardware and user virtual machines or containers that run client software.

Distinct from user virtual machines or user executable containers, a special controller virtual machine or a special controller executable container can be used to manage certain storage and I/O activities. Such a special controller virtual machine is referred to as a "CVM", or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines-above the hypervisors-thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 10D:
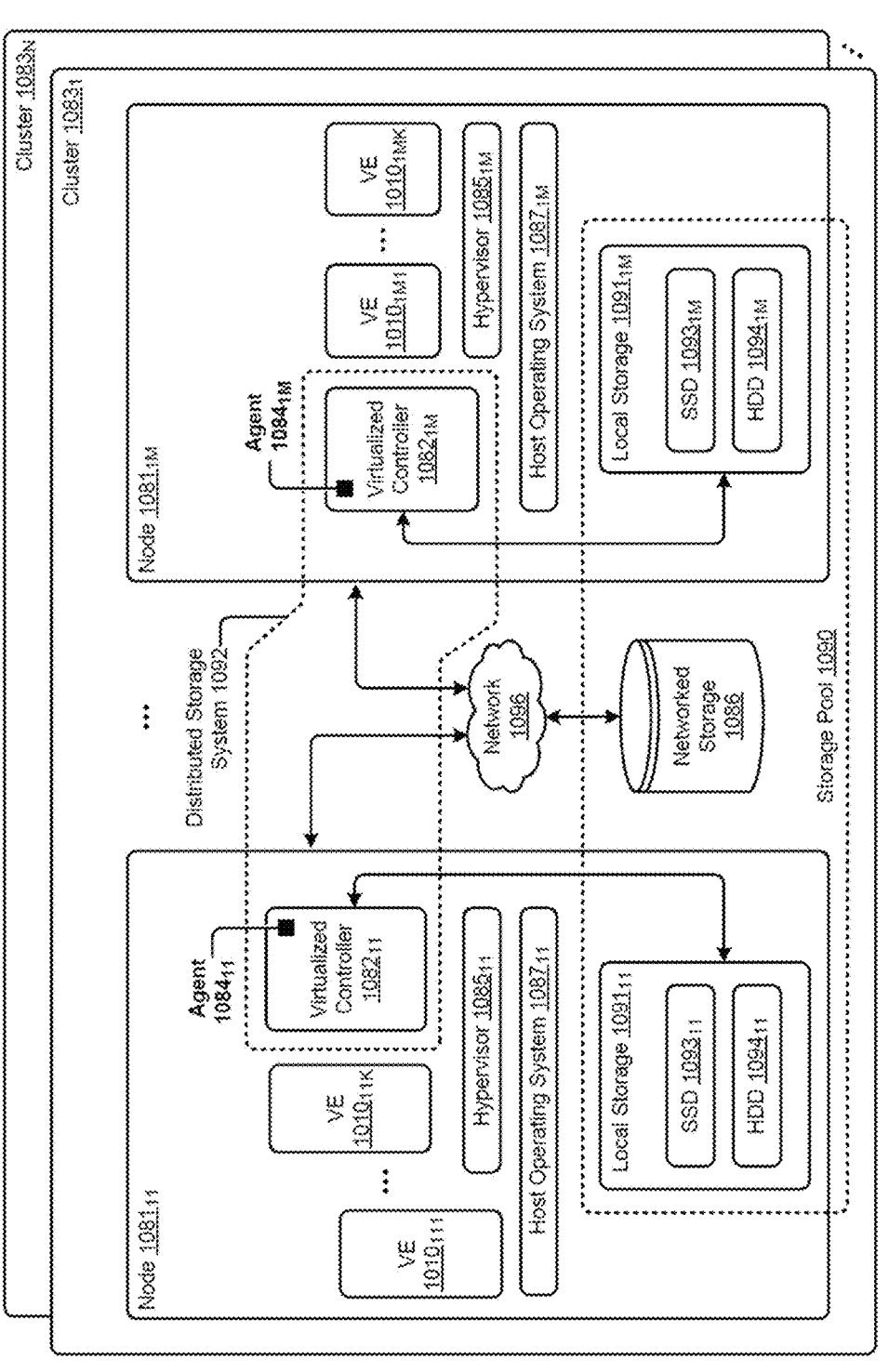
FIG. 10D depicts a distributed virtualization system in a multi-cluster environment 10D00.

FIG. 10D depicts a distributed virtualization system in a multi-cluster environment 10D00. The shown distributed virtualization system is configured to be used to implement the herein disclosed techniques. Specifically, the distributed virtualization system of FIG. 10D comprises multiple clusters (e.g., cluster $1083_1$, . . . , cluster $1083_N$) comprising multiple nodes that have multiple tiers of storage in a storage pool. Representative nodes (e.g., node $1081_{11}$, . . . , node $1081_{1M}$) and storage pool 1090 associated with cluster $1083_1$ are shown. Each node can be associated with one server, multiple servers, or portions of a server. The nodes can be associated (e.g., logically and/or physically) with the clusters. As shown, the multiple tiers of storage include storage that is accessible through a network 1096, such as a networked storage 1086 (e.g., a storage area network or SAN, network attached storage or NAS, etc.). The multiple tiers of storage further include instances of local storage (e.g., local storage $1091_{11}$, . . . , local storage $1091_{1M}$). For example, the local storage can be within or directly attached to a server and/or appliance associated with the nodes. Such local storage can include solid state drives (SSD $1093_{11}$, . . . , SSD $1093_{1M}$), hard disk drives (HDD $1094_{11}$, . . . , HDD $1094_{1M}$), and/or other storage devices.

As shown, any of the nodes of the distributed virtualization system can implement one or more user virtualized entities (VEs) such as the virtualized entity (VE) instances shown as VE $1088_{111}$, . . . , VE $1088_{11K}$, . . . , VE $1088_{1M1}$, . . . , VE $1088_{1MK}$, and/or a distributed virtualization system can implement one or more virtualized entities that may be embodied as virtual machines (VMs) and/or as executable containers. The VEs can be characterized as software-based computing "machines" implemented in a container-based or hypervisor-assisted virtualization environment that emulates underlying hardware resources (e.g., CPU, memory, etc.) of the nodes. For example, multiple VMs can operate on one physical machine (e.g., node host computer) running a single host operating system (e.g., host operating system $1087_{11}$, . . . , host operating system $1087_{1M}$), while the VMs run multiple applications on various respective guest operating systems. Such flexibility can be facilitated at least in part by a hypervisor (e.g., hypervisor instance $1085_{11}$, . . . , hypervisor instance $1085_{1M}$), which hypervisor instances are logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers comprise groups of processes and/or may use resources (e.g., memory, CPU, disk, etc.) that are isolated from the node host computer and other containers. Such executable containers directly interface with the kernel of the host operating system (e.g., host operating system $1087_{11}$, . . . , host operating system $1087_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any of one or more types of the foregoing virtualized controllers so as to facilitate access to storage pool 1090 by the VMs and/or the executable containers.

Multiple instances of such virtualized controllers can coordinate within a cluster to form the distributed storage system 1092 which can, among other operations, manage the storage pool 1090. This architecture further facilitates efficient scaling in multiple dimensions (e.g., in a dimension of computing power, in a dimension of storage space, in a dimension of network bandwidth, etc.).

A particularly-configured instance of a virtual machine at a given node can be used as a virtualized controller in a hypervisor-assisted virtualization environment to manage storage and I/O (input/output or IO) activities of any number or form of virtualized entities. For example, the virtualized entities at node $1081_{11}$ can interface with a controller virtual machine (e.g., virtualized controller $1082_{11}$) through hypervisor instance $1085_{11}$ to access data of storage pool 1090. In such cases, the controller virtual machine is not formed as part of specific implementations of a given hypervisor.

Instead, the controller virtual machine can run as a virtual machine above the hypervisor at the various node host computers. When the controller virtual machines run above the hypervisors, varying virtual machine architectures and/or hypervisors can operate with the distributed storage system 1092. For example, a hypervisor at one node in the distributed storage system 1092 might correspond to software from a first vendor, and a hypervisor at another node in the distributed storage system 1092 might correspond to a second software vendor. As another virtualized controller implementation example, executable containers can be used to implement a virtualized controller (e.g., virtualized controller 1082$_{1M}$) in an operating system virtualization environment at a given node. In this case, for example, the virtualized entities at node 1081$_{1M}$ can access the storage pool 1090 by interfacing with a controller container (e.g., virtualized controller 1082$_{1M}$) through hypervisor instance 1085$_{1M}$ and/or the kernel of host operating system 1087$_{1M}$.

In certain embodiments, one or more instances of an agent can be implemented in the distributed storage system 1092 to facilitate the herein disclosed techniques. Specifically, agent 1084$_{11}$ can be implemented in the virtualized controller 1082$_{11}$, and agent 1084$_{1M}$ can be implemented in the virtualized controller 1082$_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

Solutions attendant to incremental hibernate and resume of bare metal clusters can be brought to bear through implementation of any one or more of the foregoing techniques. Moreover, any aspect or aspects of incremental hibernate and resume of bare metal clusters can be implemented in the context of the foregoing environments.

The invention claimed is:

1. A non-transitory computer readable medium having stored thereon a sequence of instructions which, when executed by a processor causes a set of acts, the set of acts comprising:
   executing replication operations for a cluster as indicated by a snapshot schedule comprising:
      generating snapshots for processes on the cluster based on the snapshot schedule, wherein at least some snapshots comprise incremental snapshots, and the snapshots represent logical volumes of respective processes, and
      generating a cluster configuration snapshot based on the snapshot schedule, wherein the cluster configuration snapshot comprises metadata representing a configuration of the cluster, and the configuration of the cluster comprises a configuration of a management process for management of the cluster and configuration of a plurality of nodes that form the cluster;
   receiving a command to hibernate a plurality of processes of the cluster; and
   executing asynchronous hibernation operations in response to the command to hibernate a plurality of processes of the cluster comprising:
      generating new snapshots for the plurality of processes on the cluster, wherein the new snapshots comprise at least one incremental snapshot that captures changes since a last snapshot was generated by executing scheduled replication operations, and
      generating a new cluster configuration snapshot.

2. The computer readable medium of claim 1, wherein the cluster comprises at least a plurality of bare metal nodes that form a storage pool having at least some of the logical volumes.

3. The computer readable medium of claim 1, wherein the replication operations are implemented as part of a disaster recovery process.

4. The computer readable medium of claim 1, wherein the set of acts further comprise restoring the plurality of processes to the cluster using at least the incremental snapshots for the plurality of processes and the new cluster configuration snapshot.

5. The computer readable medium of claim 4, wherein restoring the plurality of processes to the cluster is implemented using an instant restore process comprising a copy-on-read process, copy-on-write process, or background process.

6. A non-transitory computer readable medium having stored thereon a sequence of instructions which, when executed by a processor causes a set of acts, the set of acts comprising:
   executing replication operations for a cluster as indicated by a snapshot schedule comprising:
      generating snapshots for processes on the cluster based on the snapshot schedule, wherein at least some snapshots comprise incremental snapshots, and the snapshots represent logical volumes of respective processes, and
      generating a cluster configuration snapshot based on the snapshot schedule;
   receiving a command to hibernate a plurality of processes of the cluster; and
   executing asynchronous hibernation operations in response to the command to hibernate a plurality of processes of the cluster, wherein only a subset of the processes on the cluster are hibernated and executing the asynchronous hibernation operations in response to the command to hibernate comprises:
      generating new snapshots for the plurality of processes on the cluster, wherein the new snapshots comprise at least one incremental snapshot that captures changes since a last snapshot was generated by executing scheduled replication operations;
      generating a new cluster configuration snapshot;
      terminating the plurality of processes in response to the command to hibernate; and
      releasing resources that are no longer used by remaining processes on the cluster.

7. The computer readable medium of claim 6, wherein executing the asynchronous hibernation operations in response to the command to hibernate further comprises:
   rebalancing and consolidating remaining processes on the cluster; and
   releasing, after rebalancing and consolidating the remaining processes on the cluster, resources that are no longer used by the remaining processes on the cluster.

8. A non-transitory computer readable medium having stored thereon a sequence of instructions which, when executed by a processor causes a set of acts, the set of acts comprising:
   executing replication operations for a cluster as indicated by a snapshot schedule comprising:
      generating snapshots for processes on the cluster based on the snapshot schedule, wherein at least some snapshots comprise incremental snapshots, and the snapshots represent logical volumes of respective processes, and
      generating a cluster configuration snapshot based on the snapshot schedule;
   receiving a command to hibernate a plurality of processes of the cluster; and
   executing asynchronous hibernation operations in response to the command to hibernate a plurality of processes of the cluster, wherein all processes on the cluster are hibernated and executing the asynchronous hibernation operations in response to the command to hibernate comprises:

generating new snapshots for the plurality of processes on the cluster, wherein the new snapshots comprise at least one incremental snapshot that captures changes since a last snapshot was generated by executing scheduled replication operations;

generating a new cluster configuration snapshot; and releasing all resources of the cluster that were previously used by any of the processes.

9. The computer readable medium of claim 8, wherein the cluster configuration snapshot comprises metadata representing a configuration of the cluster, and the set of acts further comprise restoring the plurality of processes to the cluster using at least the incremental snapshots for the plurality of processes and the new cluster configuration snapshot using an instant restore process comprising a copy-on-read process, copy-on-write process, or background process.

10. A method comprising:

executing replication operations for a cluster as indicated by a snapshot schedule comprising:

generating snapshots for processes on the cluster based on the snapshot schedule, wherein at least some snapshots comprise incremental snapshots, and the snapshots represent logical volumes of respective processes, and generating a cluster configuration snapshot based on the snapshot schedule, wherein the cluster configuration snapshot comprises metadata representing a configuration of the cluster, and the configuration of the cluster comprises a configuration of a management process for management of the cluster and configuration of a plurality of nodes that form the cluster;

receiving a command to hibernate a plurality of processes of the cluster; and executing asynchronous hibernation operations in response to the command to hibernate a plurality of processes of the cluster comprising:

generating new snapshots for the plurality of processes on the cluster, wherein the new snapshots comprise at least one incremental snapshot that captures changes since a last snapshot was generated by executing scheduled replication operations, and generating a new cluster configuration snapshot.

11. The method of claim 10, wherein the cluster comprises at least a plurality of bare metal nodes that form a storage pool having at least some of the logical volumes.

12. The method of claim 10, wherein the replication operations are implemented as part of a disaster recovery process.

13. The method of claim 10, further comprising: restoring the plurality of processes to the cluster using at least the incremental snapshots for the plurality of processes and the new cluster configuration snapshot.

14. The method of claim 13, wherein restoring the plurality of processes to the cluster is implemented using an instant restore process comprising a copy-on-read process, copy-on-write process, or background process.

15. A method comprising:

executing replication operations for a cluster as indicated by a snapshot schedule comprising:

generating snapshots for processes on the cluster based on the snapshot schedule, wherein at least some snapshots comprise incremental snapshots, and the snapshots represent logical volumes of respective processes, and generating a cluster configuration snapshot based on the snapshot schedule;

receiving a command to hibernate a plurality of processes of the cluster; and executing asynchronous hibernation operations in response to the command to hibernate a plurality of processes of the cluster, wherein only a subset of the processes on the cluster are hibernated and executing the asynchronous hibernation operations in response to the command to hibernate comprises:

generating new snapshots for the plurality of processes on the cluster, wherein the new snapshots comprise at least one incremental snapshot that captures changes since a last snapshot was generated by executing scheduled replication operations;

generating a new cluster configuration snapshot;

terminating the plurality of processes in response to the command to hibernate; and releasing resources that are no longer used by remaining processes on the cluster.

16. The method of claim 15, wherein executing the asynchronous hibernation operations in response to the command to hibernate further comprises:

rebalancing and consolidating remaining processes on the cluster; and releasing, after rebalancing and consolidating the remaining processes on the cluster, resources that are no longer used by the remaining processes on the cluster.

17. A method comprising:

executing replication operations for a cluster as indicated by a snapshot schedule comprising:

generating snapshots for processes on the cluster based on the snapshot schedule, wherein at least some snapshots comprise incremental snapshots, and the snapshots represent logical volumes of respective processes, and generating a cluster configuration snapshot based on the snapshot schedule;

receiving a command to hibernate a plurality of processes of the cluster; and executing asynchronous hibernation operations in response to the command to hibernate a plurality of processes of the cluster, wherein all processes on the cluster are hibernated and executing the asynchronous hibernation operations in response to the command to hibernate comprises;

generating new snapshots for the plurality of processes on the cluster, wherein the new snapshots comprise at least one incremental snapshot that captures changes since a last snapshot was generated by executing scheduled replication operations;

generating a new cluster configuration snapshot; and releasing all resources of the cluster that were previously used by any of the processes.

18. The method of claim 17, wherein the cluster configuration snapshot comprises metadata representing a configuration of the cluster, and the method further comprises restoring the plurality of processes to the cluster using at least the incremental snapshots for the plurality of processes and the new cluster configuration snapshot using an instant restore process comprising a copy-on-read process, copy-on-write process, or background process.

19. A system comprising:

a storage medium having stored thereon a sequence of instructions; and a processor that executes the sequence of instructions to cause the processor to perform a set of acts comprising:

executing replication operations for a cluster as indicated by a snapshot schedule comprising:

generating snapshots for processes on the cluster based on the snapshot schedule, wherein at least some snapshots comprise incremental snapshots, and the snapshots represent logical volumes of respective processes, and generating a cluster configuration snapshot based on the snapshot schedule, wherein the cluster configuration snapshot comprises metadata representing a configuration of the cluster, and the configuration of the cluster comprises a configuration of a management process for management of the cluster and configuration of a plurality of nodes that form the cluster;

receiving a command to hibernate a plurality of processes of the cluster; and executing asynchronous hibernation operations in response to the command to hibernate a plurality of processes of the cluster comprising:

generating new snapshots for the plurality of processes on the cluster, wherein the new snapshots comprise at least one incremental snapshot that captures changes since a last snapshot was generated by executing scheduled replication operations, and generating a new cluster configuration snapshot.

20. The system of claim 19, wherein the cluster comprises at least a plurality of bare metal nodes that form a storage pool having at least some of the logical volumes.

21. The system of claim 19, wherein the replication operations are implemented as part of a disaster recovery process.

22. The system of claim 19, wherein the set of acts further comprise restoring the plurality of processes to the cluster using at least the incremental snapshots for the plurality of processes and the new cluster configuration snapshot.

23. The system of claim 22, wherein restoring the plurality of processes to the cluster is implemented using an instant restore process comprising a copy-on-read process, copy-on-write process, or background process.

24. A system comprising:

a storage medium having stored thereon a sequence of instructions; and a processor that executes the sequence of instructions to cause the processor to perform a set of acts comprising:

executing replication operations for a cluster as indicated by a snapshot schedule comprising:

generating snapshots for processes on the cluster based on the snapshot schedule, wherein at least some snapshots comprise incremental snapshots, and the snapshots represent logical volumes of respective processes, and generating a cluster configuration snapshot based on the snapshot schedule;

receiving a command to hibernate a plurality of processes of the cluster; and executing asynchronous hibernation operations in response to the command to hibernate a plurality of processes of the cluster, wherein only a subset of the processes on the cluster are hibernated and executing the asynchronous hibernation operations in response to the command to hibernate comprises:

generating new snapshots for the plurality of processes on the cluster, wherein the new snapshots comprise at least one incremental snapshot that captures changes since a last snapshot was generated by executing scheduled replication operations;

generating a new cluster configuration snapshot;

terminating the plurality of processes in response to the command to hibernate; and releasing resources that are no longer used by remaining processes on the cluster.

25. The system of claim 24, wherein executing the asynchronous hibernation operations in response to the command to hibernate further comprises:

rebalancing and consolidating remaining processes on the cluster; and releasing, after rebalancing and consolidating the remaining processes on the cluster, resources that are no longer used by the remaining processes on the cluster.

26. A system comprising:

a storage medium having stored thereon a sequence of instructions; and a processor that executes the sequence of instructions to cause the processor to perform a set of acts comprising:

executing replication operations for a cluster as indicated by a snapshot schedule comprising:

generating snapshots for processes on the cluster based on the snapshot schedule, wherein at least some snapshots comprise incremental snapshots, and the snapshots represent logical volumes of respective processes, and generating a cluster configuration snapshot based on the snapshot schedule;

receiving a command to hibernate a plurality of processes of the cluster; and executing asynchronous hibernation operations in response to the command to hibernate a plurality of processes of the cluster, wherein all processes on the cluster are hibernated and executing the asynchronous hibernation operations in response to the command to hibernate comprises:

generating new snapshots for the plurality of processes on the cluster, wherein the new snapshots comprise at least one incremental snapshot that captures changes since a last snapshot was generated by executing scheduled replication operations;

generating a new cluster configuration snapshot; and releasing all resources of the cluster that were previously used by any of the processes.

27. The system of claim 26, wherein the cluster configuration snapshot comprises metadata representing a configuration of the cluster, and the set of acts further comprise restoring the plurality of processes to the cluster using at least the incremental snapshots for the plurality of processes and the new cluster configuration snapshot using an instant restore process comprising a copy-on-read process, copy-on-write process, or background process.

* * * * *